(12) United States Patent  (10) Patent No.: US 8,204,916 B2
Dawson et al.  (45) Date of Patent: Jun. 19, 2012

(54) HIERARCHICAL PRESENTATION OF SEARCH RESULTS

(75) Inventors: David Dawson, Seattle, WA (US); Paul Alexander Gusmorino, III, Seattle, WA (US); Chris J. Guzak, Kirkland, WA (US); Kenneth M. Tubbs, Issaquah, WA (US); Tyler K. Beam, Redmond, WA (US); Lyon K. F. Wong, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 374 days.

(21) Appl. No.: 12/043,816

(22) Filed: Mar. 6, 2008

(65) Prior Publication Data

US 2009/0228471 A1 Sep. 10, 2009

(51) Int. Cl.
*G06F 17/30* (2006.01)
(52) U.S. Cl. ....................................................... 707/805
(58) Field of Classification Search ................... 707/1–3, 707/10, 100, 102, 706, 709, 722, 723, 726; 715/838, 860
See application file for complete search history.

(56) References Cited

U.S. PATENT DOCUMENTS

| | | | |
|---|---|---|---|
| 5,065,347 A | 11/1991 | Pajak et al. | |
| 5,714,971 A * | 2/1998 | Shalit et al. | 715/804 |
| 6,370,538 B1 * | 4/2002 | Lamping et al. | 1/1 |
| 6,606,649 B1 | 8/2003 | Schwitters et al. | |
| 6,721,726 B1 * | 4/2004 | Swaminathan et al. | 1/1 |
| 7,065,715 B2 * | 6/2006 | Sugiyama et al. | 715/838 |
| 7,162,488 B2 | 1/2007 | DeVorchik et al. | |
| 7,484,185 B2 * | 1/2009 | Farrington et al. | 715/860 |
| 7,610,564 B1 * | 10/2009 | Pfohe et al. | 715/854 |
| 7,711,813 B1 * | 5/2010 | Yehuda et al. | 709/224 |
| 2001/0030666 A1 * | 10/2001 | Okada | 345/853 |
| 2002/0073108 A1 * | 6/2002 | Morita et al. | 707/201 |
| 2005/0246352 A1 | 11/2005 | Moore et al. | |
| 2006/0036568 A1 | 2/2006 | Moore et al. | |
| 2006/0212833 A1 | 9/2006 | Gallagher et al. | |
| 2007/0005555 A1 | 1/2007 | Jain et al. | |
| 2007/0101294 A1 | 5/2007 | Fong et al. | |
| 2007/0192696 A1 | 8/2007 | Um et al. | |

OTHER PUBLICATIONS

"Hierarchical Folder Structure," Dec. 14, 2007, http://www.umw.edu/training/banner/banner_navigation2/interface/main_menu/hierarchical_folder_struct.php, University of Mary Washington's Technology web page.
"Hierarchical Folder Exploring Page," Dec. 14, 2007, http://wps2a.semi.org/cms/help/extras/wwhelp/wwhimpl/common/html/wwheld.htm?context=Extras_Components&file=05_folders42.htm.

* cited by examiner

*Primary Examiner* — Cam-Linh Nguyen
(74) *Attorney, Agent, or Firm* — Shook, Hardy & Bacon L.L.P.

(57) ABSTRACT

Methods, and computer-readable media for presenting search results in a folder hierarchy are provided. Embodiments of the present invention include providing a navigation portion in which data sources to be searched are selected, and an input portion into which search criteria may be submitted. Items within the selected data sources that match the search criteria are identified and presented as a folder hierarchy. The folder hierarchy may only include items that satisfy the search criteria, but otherwise is consistent with the native folder hierarchy in which the items normally reside. In one embodiment, the initial presentation of the search results includes only top-level folders that contain, at some level, items that satisfy the search criteria. The items can be located by drilling down from the top-level folders.

17 Claims, 27 Drawing Sheets

HIERARCHICAL PRESENTATION OF SEARCH RESULTS

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention generally relate to a method of displaying search results in a replicated folder hierarchy that is consistent with the native folder hierarchy in which the objects of the search reside. In one embodiment, the replicated folder hierarchy contains only files or folders that satisfy the search criteria. A folder may satisfy the search criteria when it contains at least one file, at any level, that satisfies the search criteria. The files and folders in the replicated folder hierarchy may be presented such that changes to the replicated files and folders cause a corresponding change to be made to the native files and folders. The data sources over which the search is run may be defined by a library. In one embodiment, the libraries may be displayed concurrently with the replicated folder hierarchy.

BRIEF DESCRIPTION OF THE DRAWINGS

The present invention is described in detail below with reference to the attached drawing figures, wherein.

DETAILED DESCRIPTION

Figure 1:
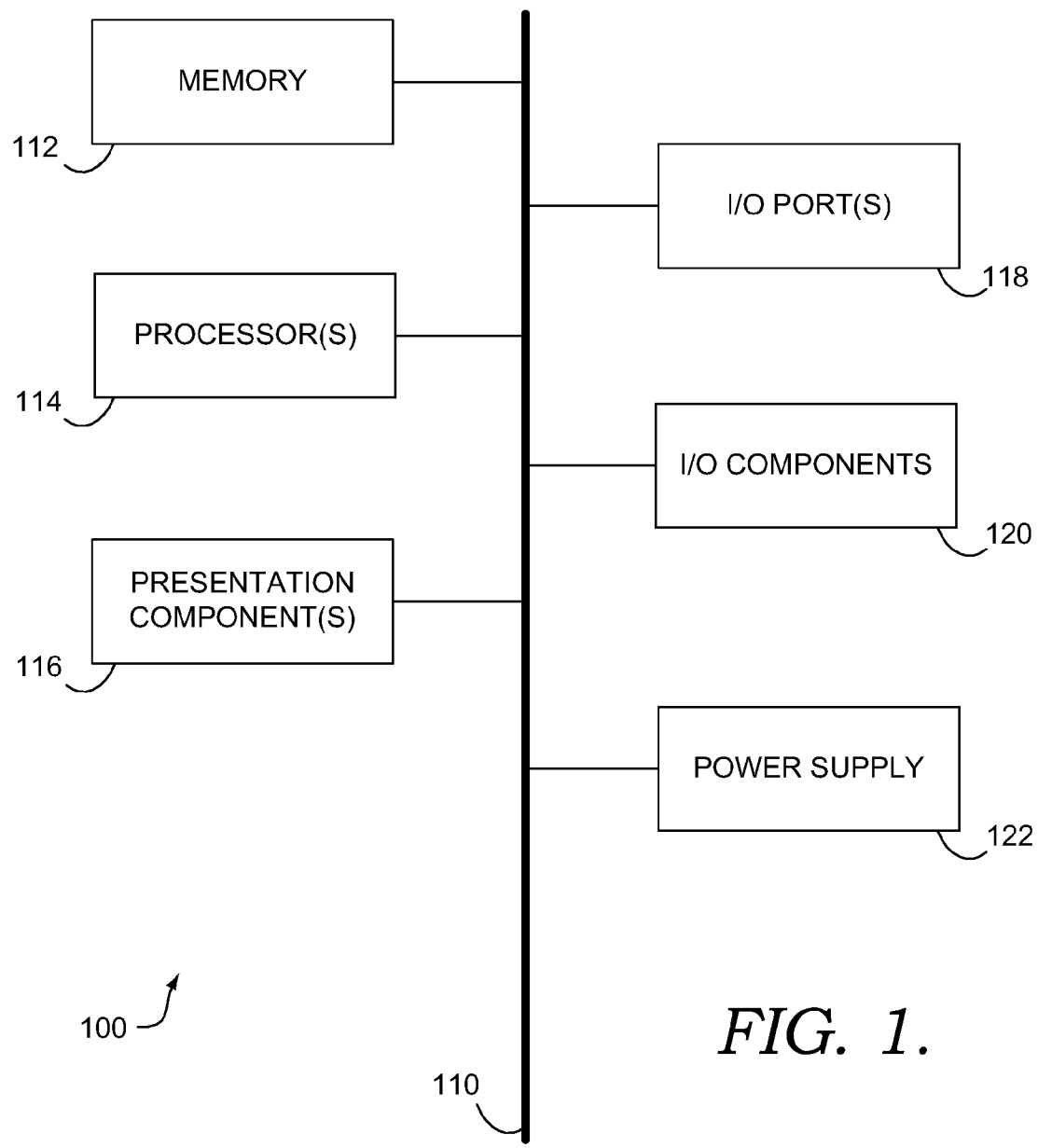
FIG. 1 is a block diagram of an exemplary computing environment suitable for implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Accordingly, in one embodiment, one or more computer-readable media having computer-executable instructions embodied thereon for presenting search results in a graphical user interface (GUI) are provided. The GUI includes a navigation portion that displays contents of a library that includes one or more data sources on which a search is to be conducted, wherein the contents of the library are displayed with the library as a root folder and the one or more data sources as subfolders of the root folder. The GUI also includes an input portion that receives search criteria that is used to determine the search results. The GUI further includes an items-view portion that displays the search results. The search results include one or more items from the library that satisfy the search criteria. The one or more items are displayed in a hierarchal-folder format that is consistent with an organizational structure in which the one or more items actually reside.

In another embodiment, the present invention relates to a method of presenting search results in a replicated folder hierarchy that is consistent with a native folder hierarchy in which the search results normally reside. The method includes receiving search criteria that are to be used to search at least one data source that stores files and folders. The method also includes identifying items that satisfy the search criteria, wherein a folder might be an item, and the folder would satisfy the search criteria if the folder contains at least one file, at any level, that satisfies the search criteria. The method further includes displaying the items in a replicated folder hierarchy that is consistent with the native folder hierarchy in which items normally reside, such that a user may locate an item within the replicated folder hierarchy by starting from a top-level folder and browsing through the replicated folder hierarchy until the item is located.

In yet another embodiment, the present invention relates to a method of presenting items returned from a search according to an item's native folder hierarchy. The method includes receiving search criteria and searching one or more data sources, which include a native folder hierarchy, for one or more items that satisfy the search criteria. The method also includes determining a top-level folder for each of the one or more items based on the native folder hierarchy in which the one or more items natively reside. The method further includes displaying an items portion that includes the top-level folder for each of the one or more items, wherein an individual top-level folder is displayed only once even though the individual top-level folder is the top-level folder for more than one of the one or more items.

Having briefly described an overview of embodiments of the present invention, an exemplary operating environment suitable for use in implementing embodiments of the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices; or any other medium that can be used to encode desired information and be accessed by computing device 100.

Memory 112 includes computer storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Data within a data source may be organized in a hierarchical folder structure. For the purpose of this application a data source may be a data store, a subsection of a data store, a memory device, or a subsection of a memory device. For example, the C:\ drive on a computing device is an example of a data source. However, the My Documents folder within the C:\ may also be designated as a data source. The data source may also be referred to as the root folder. A native folder hierarchy is the organizational structure in which folders and files are stored in a data source. In another embodiment, the native folder hierarchy is the organization structure presented to the user by an operating system, but may not reflect the actual storage structure on a memory device. The specific aspects and organization of folder hierarchies may differ from operating system to operating system; however, all folder hierarchies basically include of multiple levels of folders and files.

A folder hierarchy includes levels (i.e., hierarchies) of folders and files. The hierarchy is contained in a root folder, which may also be described as a data source. Folders beneath another folder may be described as subfolders. An individual folder may store either files or additional subfolders. Those subfolders may in turn store more files and subfolders. When displayed in a graphical user interface a user may typically browse the folder hierarchy by clicking on or selecting a first-level folder, which then exposes the subfolders one level below the first-level folder along with any files that are within the selected first-level folder. The exposed subfolders and files may be described as second level folders and files. Additional levels of the folder hierarchy may be accessed by selecting the various subfolders until the desired folder or file is accessed. The native folder hierarchy may be displayed on a graphical user interface that allows users to view and select folders and files.

Three exemplary native folder hierarchies are illustrated in FIGS. 2A-E, FIGS. 3A-C, and FIGS. 4A-E. These native folder hierarchies will be used throughout the description to illustrate various embodiments. In each case, the folder hierarchy is a native folder hierarchy indicating the organizational structure of the files and folders as they are organized by the operating system. Further, in each case, the folder hierarchies are shown apart from a graphical user interface. The purpose of these figures is to illustrate the organization of the files and folders in the folder hierarchies rather than the display of the folder hierarchies themselves.

Figure 2A:
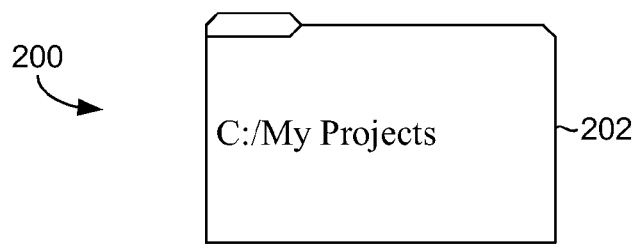
FIG. 2A shows the root folder of an exemplary native folder hierarchy designated generally as native folder hierarchy 200.

FIG. 2A shows the root folder 202 of native folder hierarchy 200. Root folder 202 is entitled "C:/My Projects." As will be familiar to those having ordinary skill in the art, the "C:\" indicates the "My Projects" folder is on the C drive of a computing device, such as computing device 100.

Figure 2B:
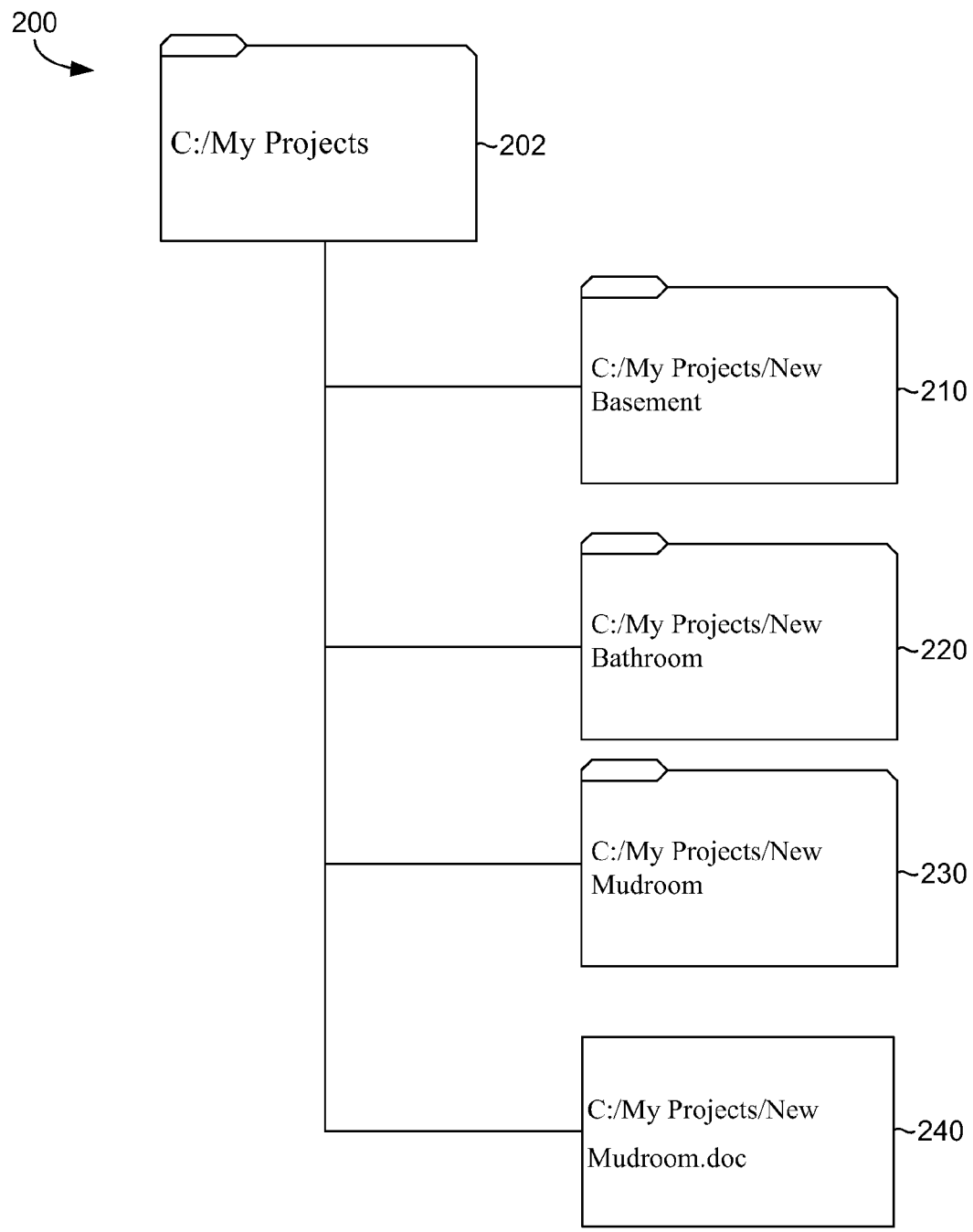
FIG. 2B shows the root folder and first level of an exemplary native folder hierarchy designated generally as native folder hierarchy 200.

FIG. 2B shows the folder 202 and Level 1 of native folder hierarchy 200. Level 1 includes subfolder 210, subfolder 220, subfolder 230 and file 240. Subfolder 210, subfolder 220, subfolder 230 and file 240 are each subfolders of root folder 202. Folders on Level 1 may be described as below root folder 202.

Figure 2C:
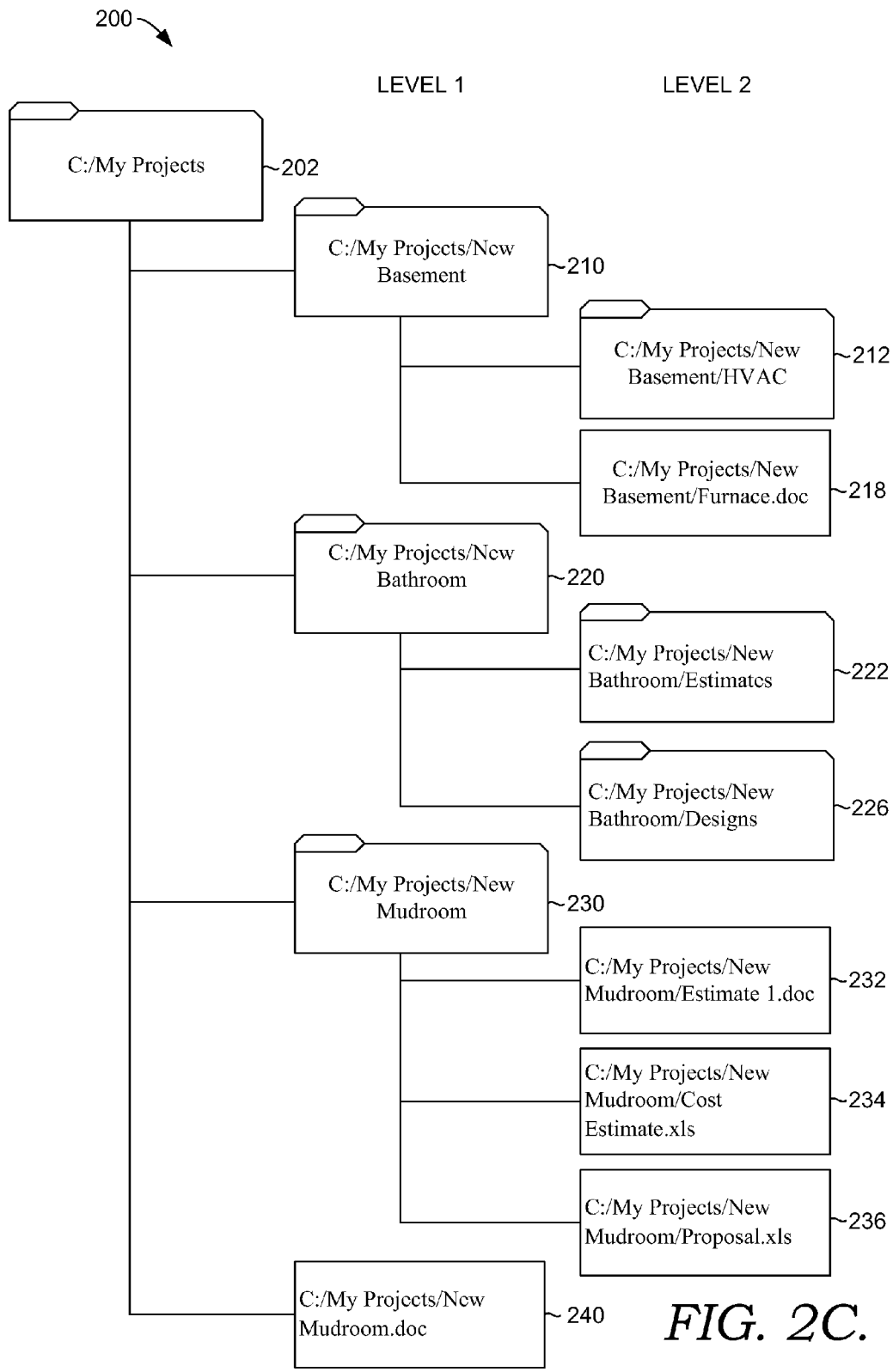
FIG. 2C shows the root folder, first level and second level of an exemplary native folder hierarchy designated generally as native folder hierarchy 200.

FIG. 2C shows the root folder 202, Level 1, and Level 2 of native folder hierarchy 200. The folders in Level 1 have been described previously with reference to FIG. 2B. The subfolders and files in Level 2 include subfolder 212 and file 218, which are both located in subfolder 210 and root folder 202. Level 2 also includes subfolder 222 and subfolder 226, which are subfolders of subfolder 220 and root folder 202. Level 2 also includes file 232, file 234, and file 236, which are in located in subfolder 230. The ".doc" extension on file 232 indicates that it is a word-processing file. The ".xls" extension on files 234 and 236 indicates that they are spreadsheet files. These are just two examples of the types of files that could be in a folder hierarchy and are not meant to be limiting in any manner.

Figure 2D:
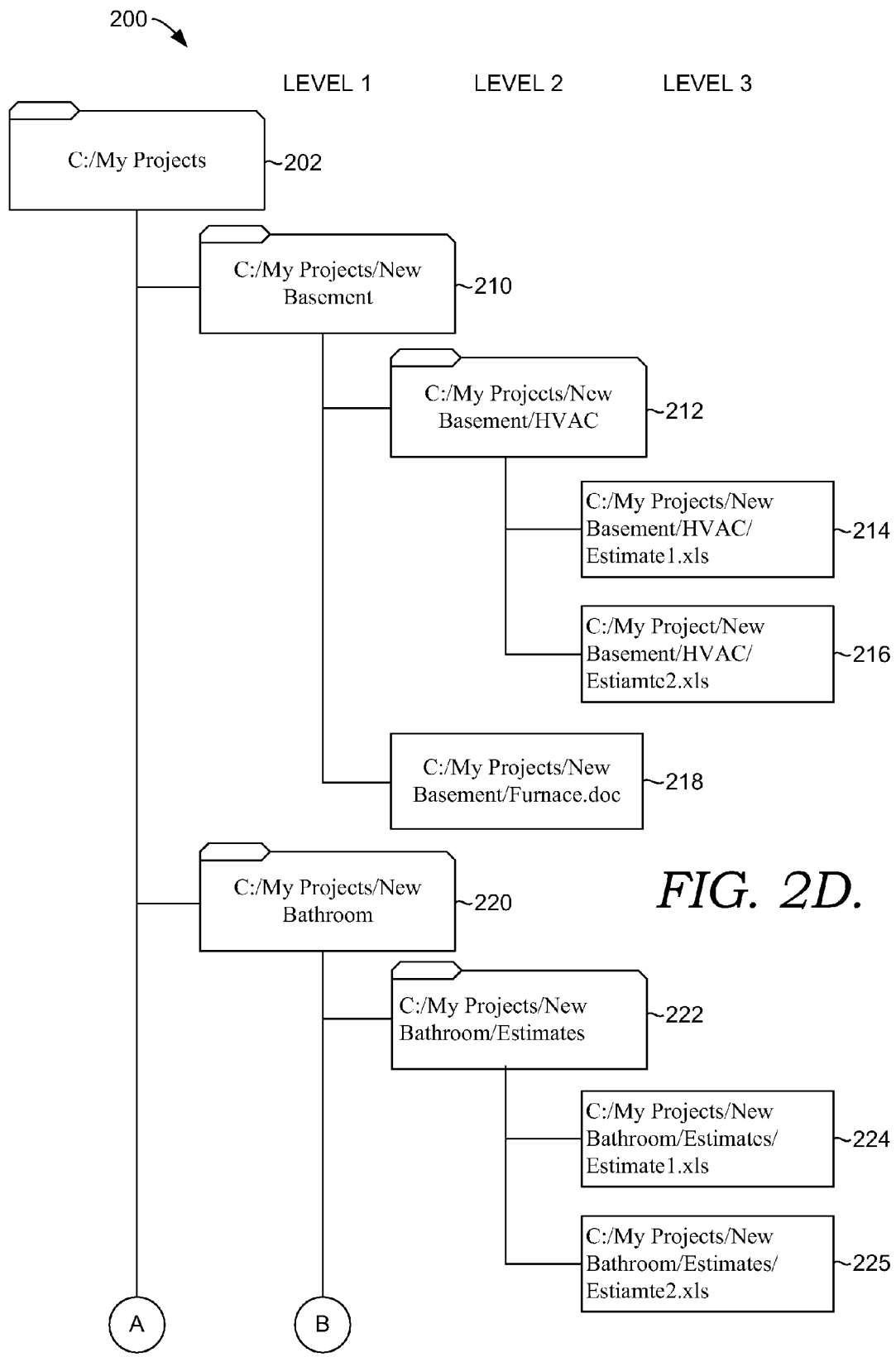
FIG. 2D-E shows the root folder, first level, second level and third level of an exemplary native folder hierarchy designated generally as native folder hierarchy 200.
Figure 2E:
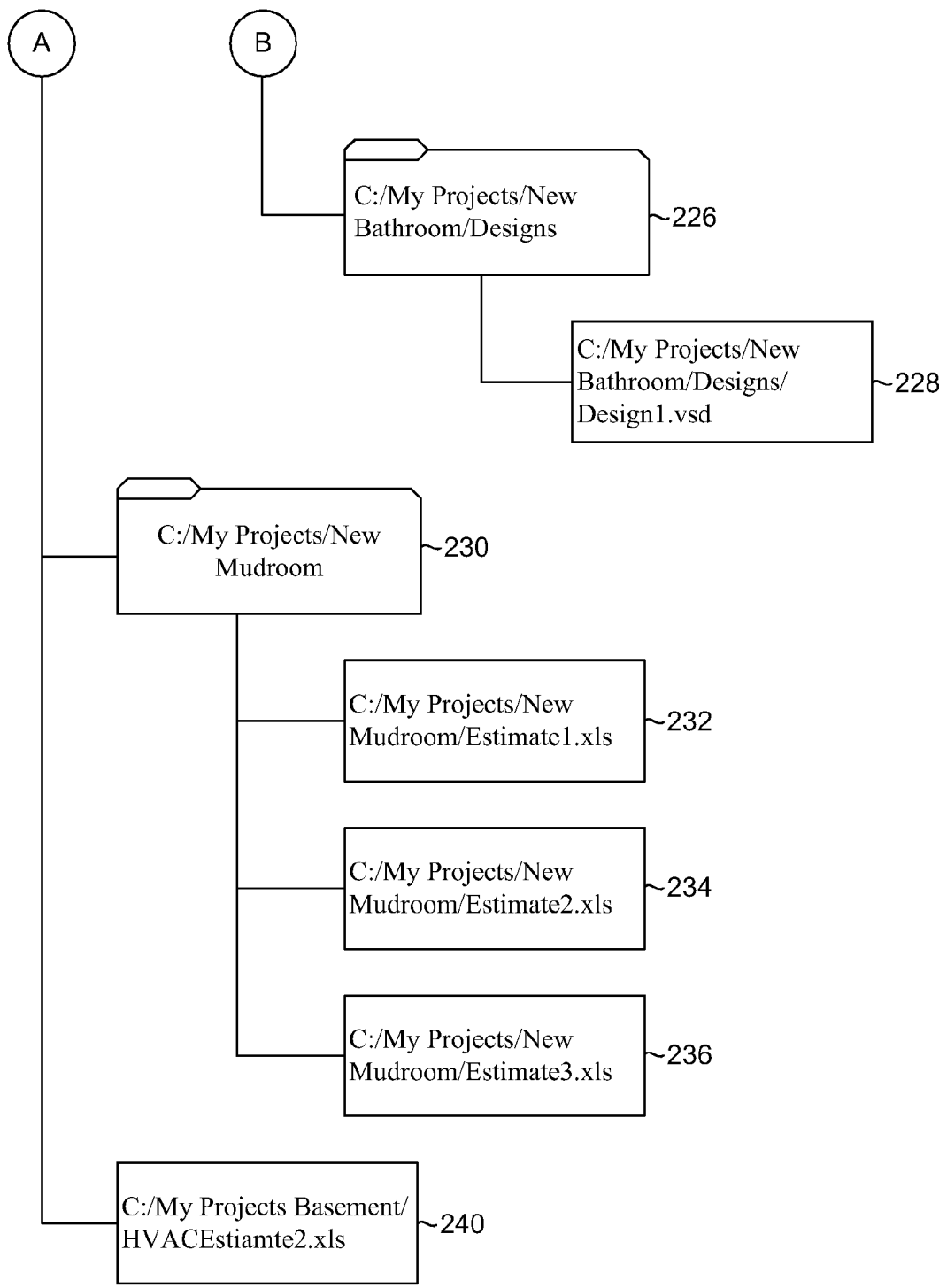

FIGS. 2D and 2E show root folder 202 and Levels 1-3 of native folder hierarchy 200. The root folder 202 and Levels 1-2 have been described previously with reference to FIGS. 2A, 2B, and 2C. Level 3 includes file 214 and file 216, which are both in subfolder 212. File 214 and file 216 are both spreadsheet files. Level 3 also includes file 224 and file 225, both of which are in subfolder 222. File 224 and file 225 are both spreadsheet files. Finally, Level 3 also includes file 228, which is in subfolder 226. The "vsd" extension indicates that file 228 is a drawing file.

Figure 3A:
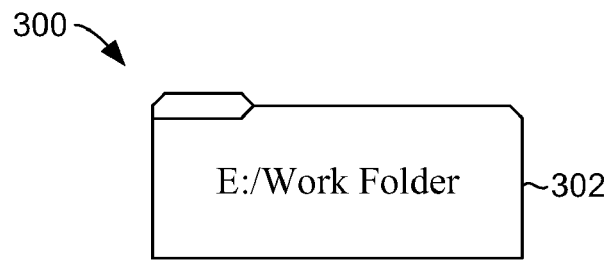
FIG. 3A shows the root folder of an exemplary native folder hierarchy designated generally as native folder hierarchy 300.

FIG. 3A shows root folder 302 of native folder hierarchy 300. Root folder 302 is entitled "E:/Work." As will be familiar to those having ordinary skill in the art, the "E:" indicates the "work" folder is on the E drive of a computing device, such as computing device 100. In one embodiment, the E drive is a network drive that is in a different physical location than the C drive and may be accessed over a network.

Figure 3B:
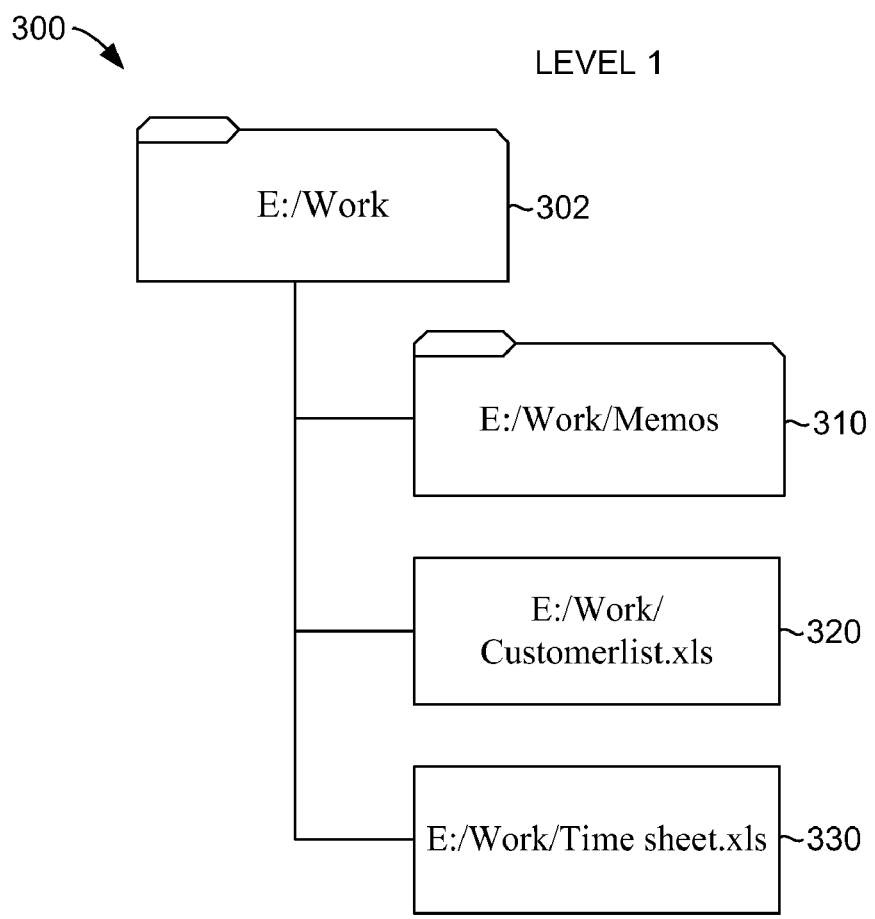
FIG. 3B shows the root folder and first level of an exemplary native folder hierarchy designated generally as native folder hierarchy 300.

FIG. 3B shows root folder 302 and Level 1 of native folder hierarchy 300. Level 1 includes subfolder 310, file 320, and file 330. File 320 and file 330 are both spreadsheet files. Subfolder 310, file 320, and file 330 may be described as beneath root folder 302.

Figure 3C:
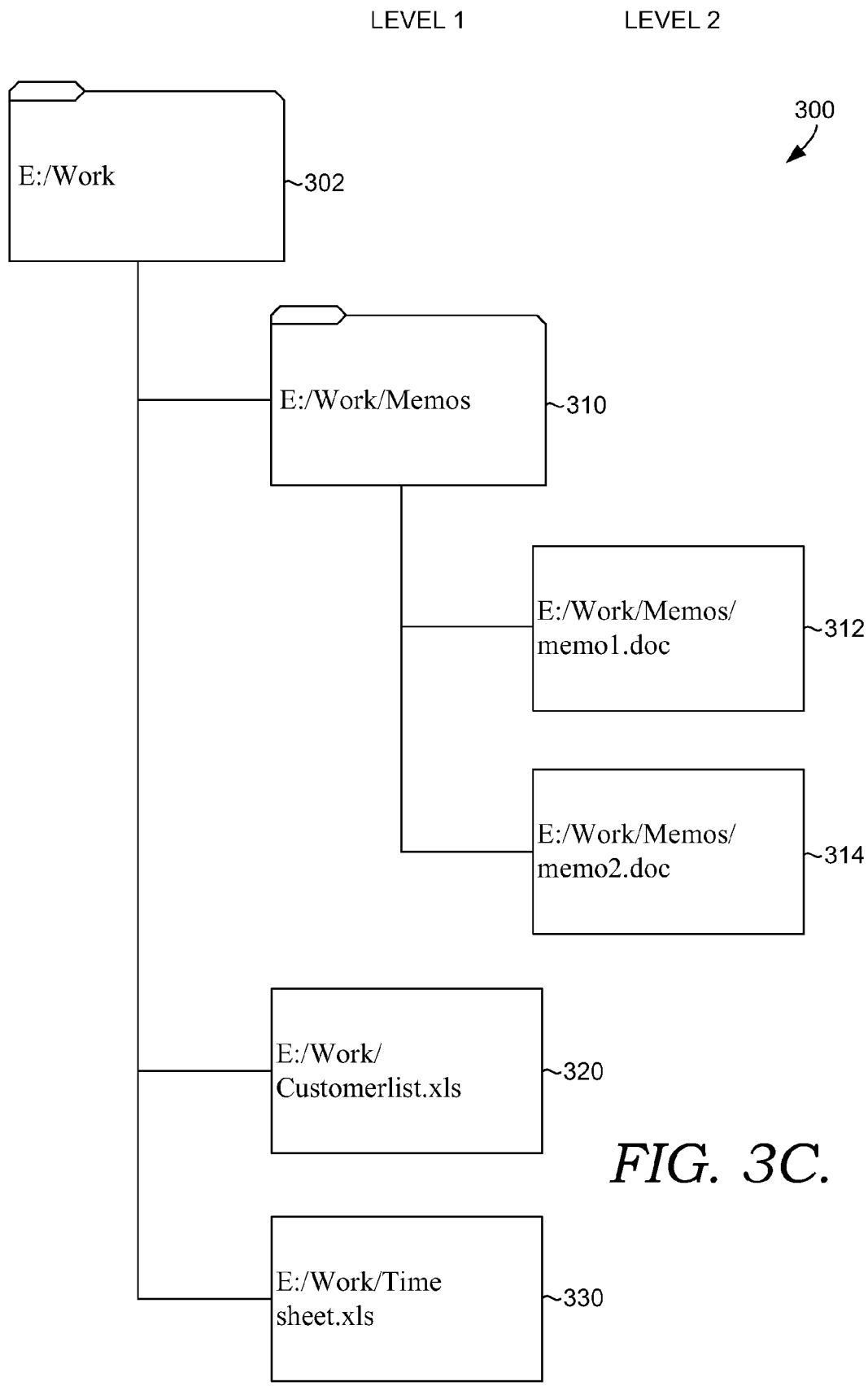
FIG. 3C shows the root folder, first level and second level of an exemplary native folder hierarchy designated generally as native folder hierarchy 300.

FIG. 3C shows root folder 302 and Levels 1-2 of native folder hierarchy 300. The root folder and Level 1 have been described previously with reference to FIGS. 3A and 3B. Level 2 includes file 312 and file 314 both of which are in subfolder 310. File 312 and file 314 are both word-processing files.

Figure 4A:
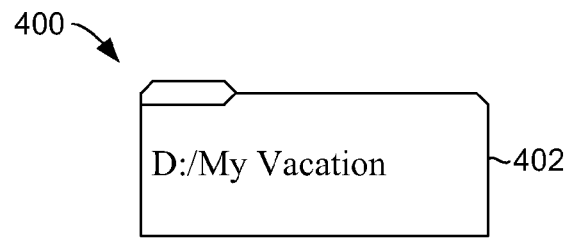
FIG. 4A shows the root folder of an exemplary native folder hierarchy designated generally as native folder hierarchy 400.

FIG. 4A shows root folder 402 of native folder hierarchy 400. Root folder 402 is entitled "D:/My Vacation." As will be familiar to those having ordinary skill in the art, the "D:" indicates the "My Vacation" folder is on the D drive of a computing device. The D drive may be on a different physical memory device than the C drive and the E drive. For example, drive D could be a removable drive.

Figure 4B:
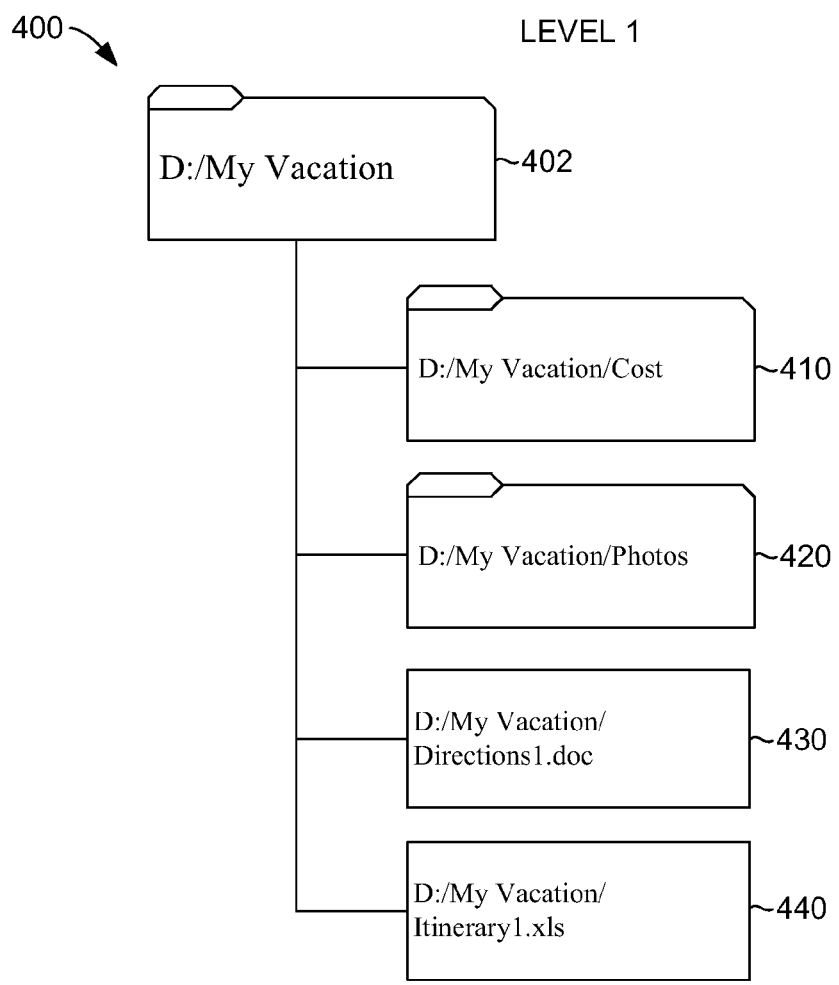
FIG. 4B shows the root folder and first level of an exemplary native folder hierarchy designated generally as native folder hierarchy 400.

FIG. 4B shows root folder 402 and Level 1 of native folder hierarchy 400. Level 1 includes subfolder 410, subfolder 420, file 430, and file 440. File 430 is a word-processing file and file 440 is a spreadsheet file.

Figure 4C:
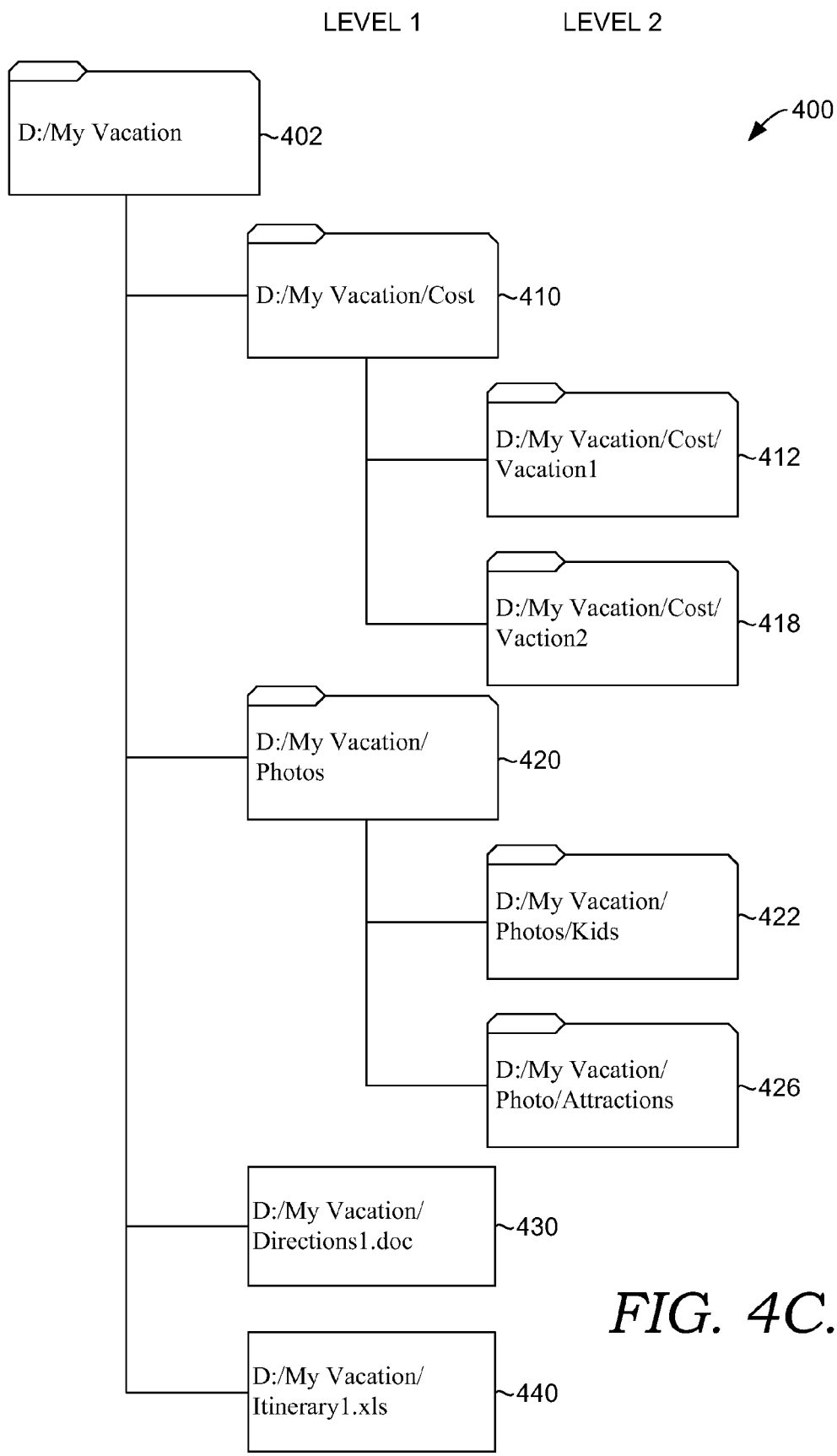
FIG. 4C shows the root folder, first level and second level of an exemplary native folder hierarchy designated generally as native folder hierarchy 400.

FIG. 4C shows root folder 402 and Levels 1 and 2 of native folder hierarchy 400. Root folder 402 and Level 1 have been described previously with reference to FIGS. 4A and 4B. Level 2 includes subfolder 412 and subfolder 418, both of which are subfolders of subfolder 410. Level 2 also includes subfolder 422 and subfolder 426, both of which are subfolders of subfolder 420.

Figure 4D:
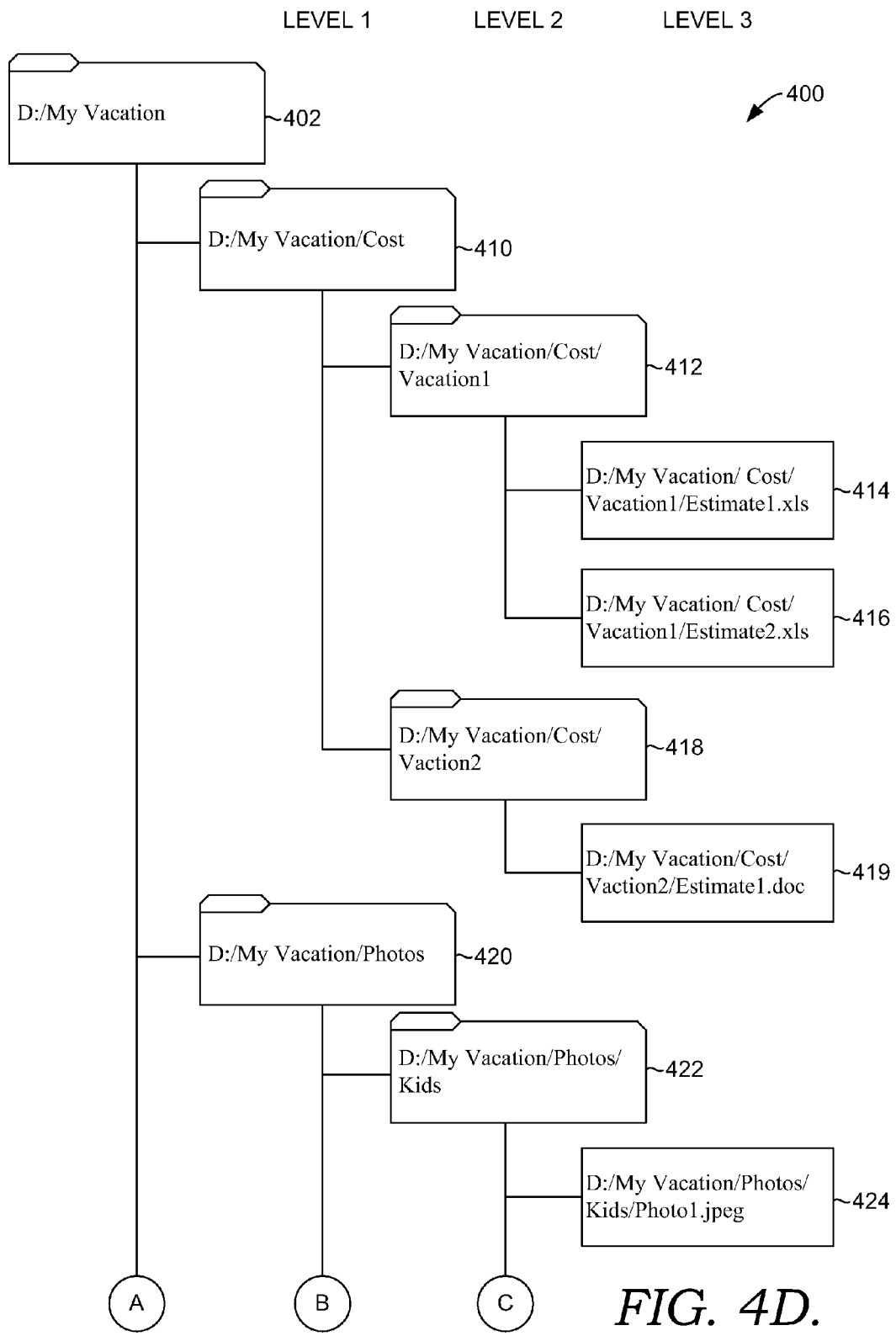
FIG. 4D-E shows the root folder, first level, second level and third level of an exemplary native folder hierarchy designated generally as native folder hierarchy 400.
Figure 4E:
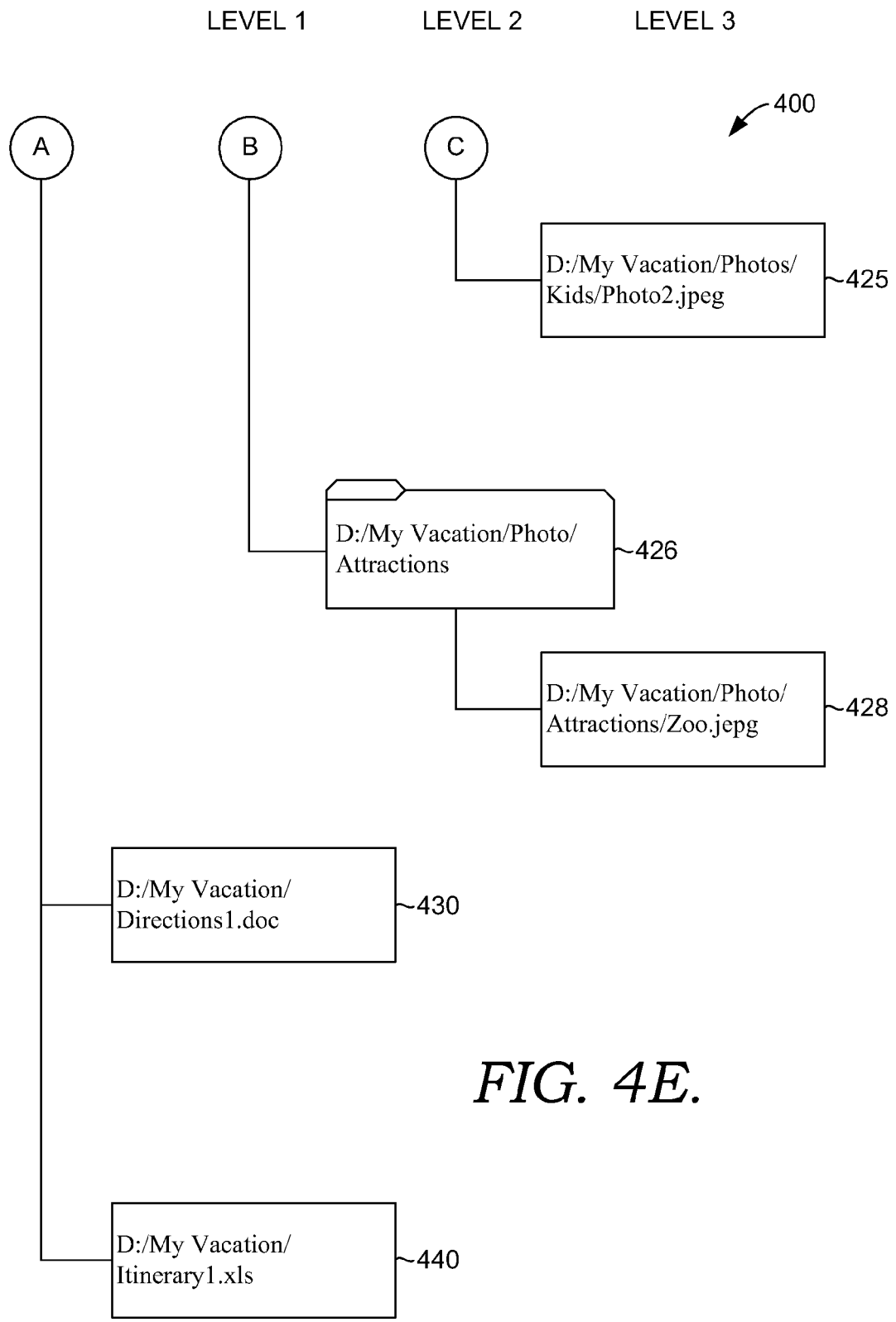

FIGS. 4D and 4E show root folder 402 and Levels 1-3 of native folder hierarchy 400. Root folder 402 and Levels 1-2 have been described previously with reference to FIGS. 4A, 4B, and 4C. Level 3 includes file 414 and file 416, both of which are in subfolder 412. File 414 and file 416 are both spreadsheet files. Level 3 also includes file 419, which is in subfolder 418. File 419 is a word-processing file. Level 3 further includes file 424 and file 425, both of which are in subfolder 422. Both file 424 and file 425 are picture files as indicated by the ".jpeg" extension. Level 3 further includes file 428, which is in subfolder 426. File 428 is also a picture file.

In general, embodiments of the present invention present search results in a replicated folder hierarchy. Search results may include of files and folders within one or more designated data sources that match a supplied search criteria. The search results are presented in a replicated folder hierarchy that is consistent with the native folder hierarchy in which the files and folders reside. Only folders or files that match the search criteria are included in the replicated folder hierarchy. The replicated folder hierarchy will include only first-level folders that contain a file or folder, at any level, that matches the search criteria. Likewise, the second-level of the replicated folder hierarchy includes only files or folders that match the search criteria. The file or folder that actually matches the search criteria may be accessed by drilling down through the replicated folder hierarchy until the file or folder is found. In one embodiment, the changes made to the replicated files and folders will also be made to the corresponding native files or folders.

Turning now to FIG. 5, a graphical user interface (GUI) for presenting search results in accordance with embodiments of the present invention is shown and designated generally as user interface 500. User interface 500 includes navigation portion 510, items-view portion 520, input portion 530, details portion 540, location portion 550, and menu portion 560. Navigation portion 510 is configured for displaying one or more libraries and receiving input regarding the selection of a library or data sources within the library. The libraries displayed in navigation portion 510 may be grouped by user. For example library 514, library 516, library 518, and library 519 are all grouped under user 512 "John Doe." Library 514, entitled "Documents" includes data source 202A, data source 302A, and data source 402A. These data sources correspond with root folder 202 in native folder hierarchy 200, root folder 302 in native folder hierarchy 300, root folder 402 in native folder hierarchy 400 described previously in FIGS. 2-4. A library is a collection of data sources. As can be seen, a data source may be a folder such as the "My Project" folder. Other examples of data sources include an entire drive, a database, and a web or opensearch database. The data sources grouped within a library may be in completely separate physical storage devices or mapped drives. On the other hand, the data sources could all be subfolders within the same drive. Regardless of the actual organization of the data sources in the library, the data sources may be presented as a single folder hierarchy with the library as the root folder and the data sources as first-level subfolders. The native organization of the data sources are not changed.

Data sources may be added to or removed from a library by a wizard. The wizard may be activated by selecting folder 513. In embodiments, the wizard may also be activated through the menu portion 560, or by left clicking in the navigation portion 510. The wizard may also create additional libraries or delete existing libraries.

Continuing with FIG. 5, the items-view portion 520 presents the search results as a replicated folder hierarchy. The scope of search results are defined by the library selected in navigation portion 510 and by search criteria submitted in input portion 530. The data sources on which the search is conducted is defined by the selection of a library, or individual data source, or even a folder within a data source by making a selection in navigation portion 510. Within the selected data sources, items matching the search criteria entered into input portion 530 are identified. The items are presented in a folder hierarchy that replicates the native folder hierarchy in which the items normally reside. Only items that satisfy the search criteria are shown in the items-view portion. This will become clearer with the examples given in FIG. 6, FIG. 7, and FIG. 8.

Figure 5A:
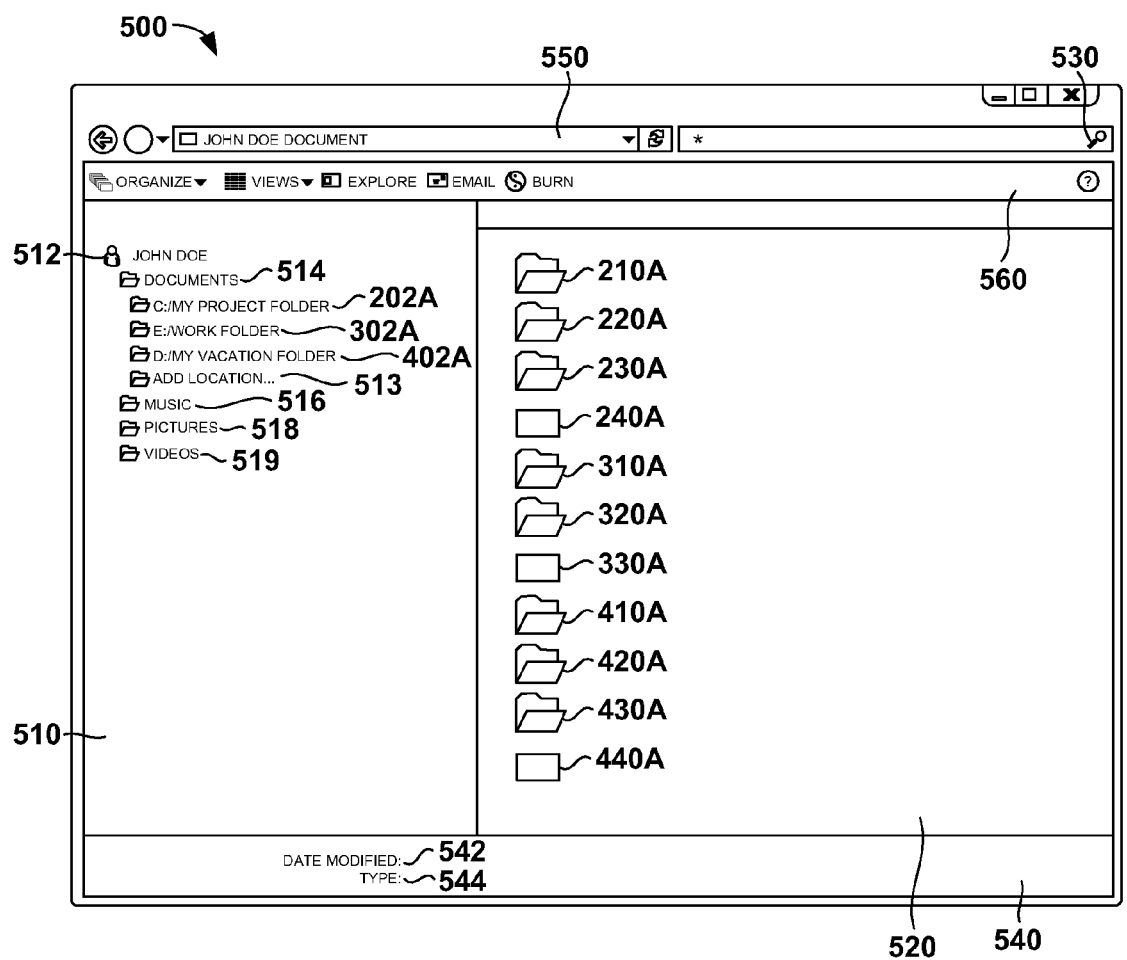
FIG. 5A, is a drawing of a graphical user interface for displaying search results as a folder hierarchy according to an embodiment of the present invention.

The details portion 540 shows various details about a selected library, or data source in the navigation portion 510. For example, the date an item is modified 542 or the type of file 544 may be displayed. In another embodiment, the details portion 540 shows information about an individual file or folder selected in the items-view portion 520. Location portion 550 shows the library or library subfolder presently selected in the navigation portion 510. The location portion in FIG. 5A shows "John Doe Document" indicating that the folder 514 is presently selected. Menu portion 560 includes access to various menu items that may be incorporated into graphical user interface 500. The menu items shown are for the purpose of example only and are not intended to limit embodiments of the invention in any manner.

Items-view portion 520 displays the results of a search in a replicated folder hierarchy. In this instance, no search criteria has been entered into input portion 530. When no search criteria is entered, the results presented in items-view portion 520 include all of the items in the selected library. The same result would occur if a wildcard were entered as the search criteria. Thus, items-view portion 520 displays all of the first-level folders from data sources 202A, 302A and 402A. The first-level items displayed included folder 210A, folder 220A, folder 230A, file 240A, folder 310A, file 320A, file 330A, folder 410A, folder 420A, folder 430A, and file 440A. This list of items includes all of the first-level folders from native folder hierarchy 200, native folder hierarchy 300, and native folder hierarchy 400. The replicated files and folders correspond with folder 210, folder 220, folder 230, file 240, folder 310, file 320, file 330, folder 410, folder 420, folder 430 and file 440 respectively.

Figure 5B:
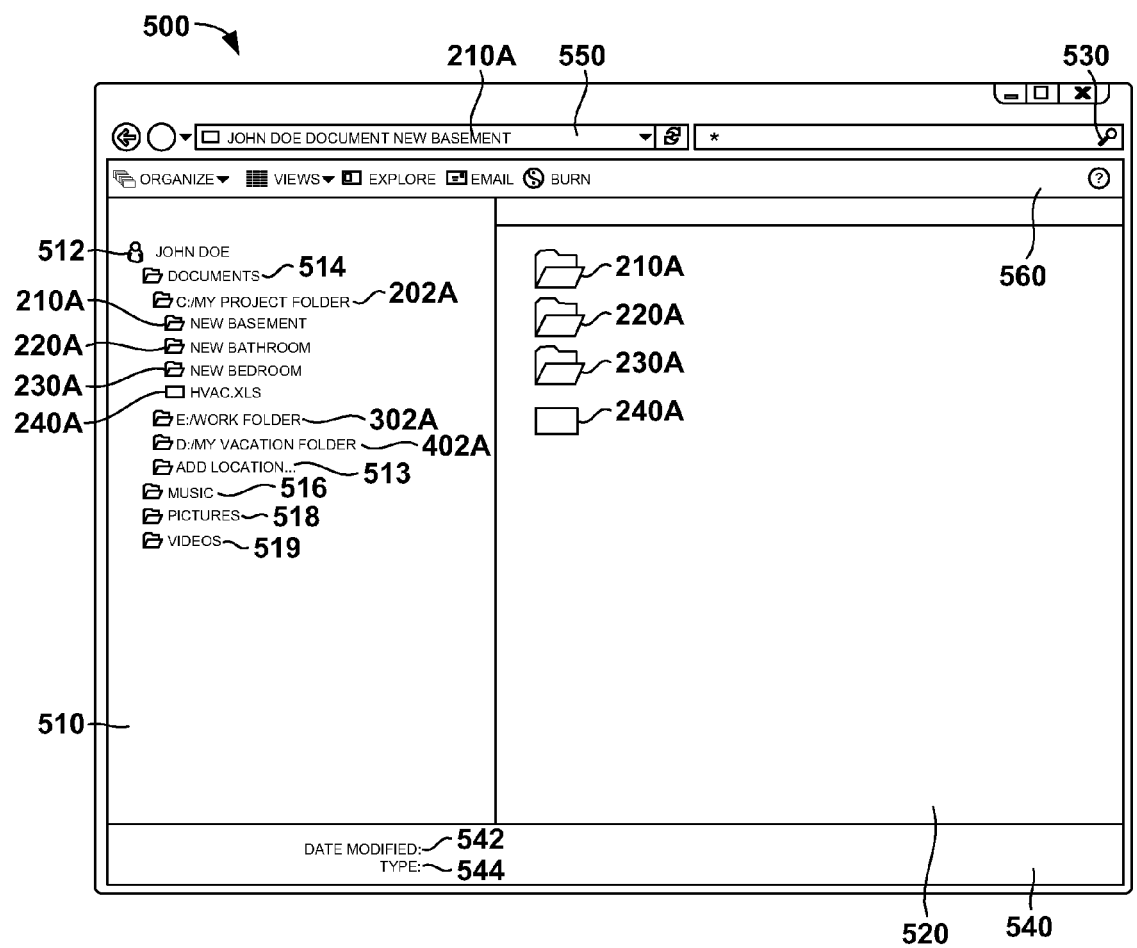
FIG. 5B, is a drawing of a graphical user interface for displaying search results as a folder hierarchy that illustrates the change in the search scope when a data source is selected in the navigation pane according to an embodiment of the present invention.

FIG. 5B illustrates the browsable nature of the data sources in a library. A data source is browsable when subfolders beneath it are exposed upon selection of the data source, thereby making it possible to view items within the data source. In one embodiment, upon selecting folder 202A, subfolder 210A, subfolder 220A, subfolder 230A, and file 240A are shown in navigation portion 510. The files and folders a level below any of the exposed folders may be displayed by selecting that folder. The purpose of this illustration is to demonstrate that the data sources within the library may be fully browsable. In addition, by selecting a folder at any level the search results displayed in items-view portion 520 will be limited to items contained only in the selected folder. This is illustrated in the items-view portion where only folder 210A, folder 220A, folder 230A and file 240A are shown in response to the user's selection of folder 202A in the navigation portion 510. In this example, folder 202A becomes the data source as shown in location portion 550. Again, no search criteria have been entered so all subfolders within folder 202A are displayed in items view portion 520. In the embodiment shown, only the first-level subfolders, which are subfolders beneath the selected data source are displayed in the initial view. Subfolders beneath folder 210A, folder 220A, or folder 230A could be displayed in response to the selection of any of these folders in items-view portion 520.

Figure 6A:
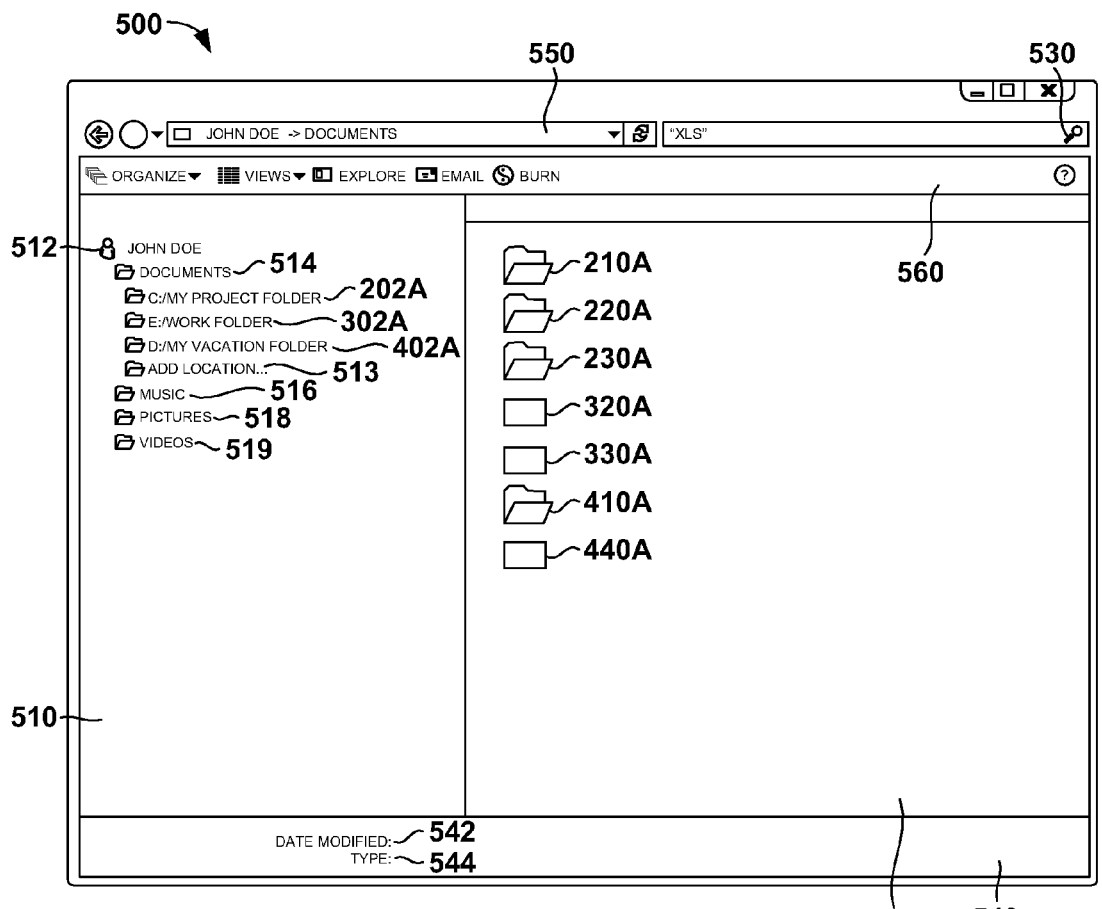
FIG. 6A, is a drawing of a graphical user interface for displaying search results as a folder hierarchy where a data source is selected and search criteria submitted according to an embodiment of the present invention.

Turning now to FIG. 6A, a search result is shown presented in response to the selection of a data source and the submission of a search criteria. In the illustrated embodiment, library 514 is selected as illustrated by "John Doe Documents" displayed in location portion 550. In addition, the search criteria "XLS" has been entered in input portion 530. The combination of these criteria limit the scope of the search to library 514 and files that contain XLS, which is the extension for spreadsheet files. Thus, in items-view portion 520 only folders that contain a file at some level that contains "XLS" (i.e. a spreadsheet file) are shown. For example, folder 210A is shown because spreadsheet files 214 and 216 from the corresponding native folder hierarchy reside two levels below in subfolder 212. In addition, files on the first level, such as file 440A, which is a spreadsheet file are shown. Folders and files not containing a spreadsheet file are not shown. Thus, the items-view portion includes folder 210A, folder 220A, folder 230A, file 320A, file 330A, folder 410A, and file 440A.

Figure 6B:
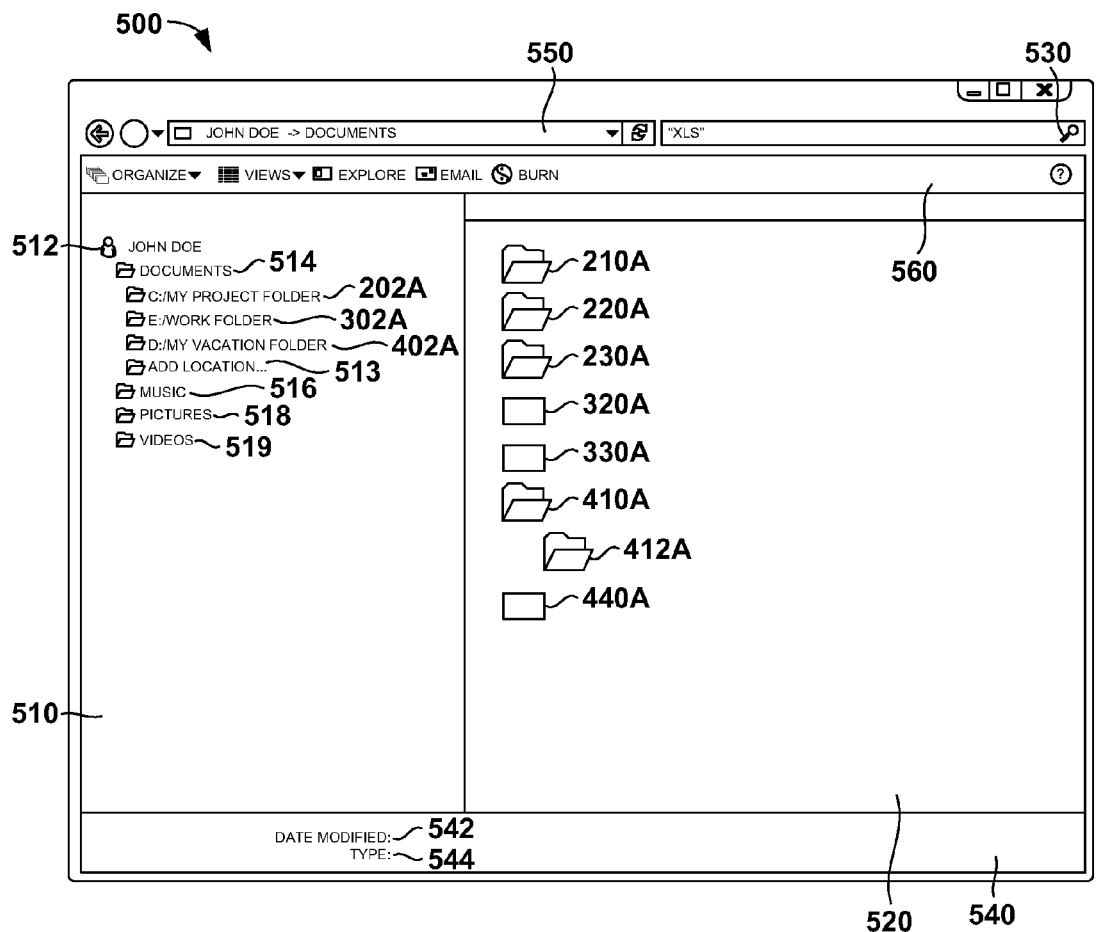
FIG. 6B, is a drawing of a graphical user interface for displaying search results as a folder hierarchy and browsing the search results to the first level according to an embodiment of the present invention.

Turning now to FIG. 6B, the browsable nature of the replicated folder hierarchy shown in items-view portion 520 is illustrated. In this instance, folder 410A has been selected. In response, folder 412A is shown because it contains spreadsheet files 414A and 416A. Again, only folders containing a spreadsheet file, at some level, are included in the replicated folder hierarchy. For example, folder 418A is not displayed because it does not contain a spreadsheet file.

Figure 6C:
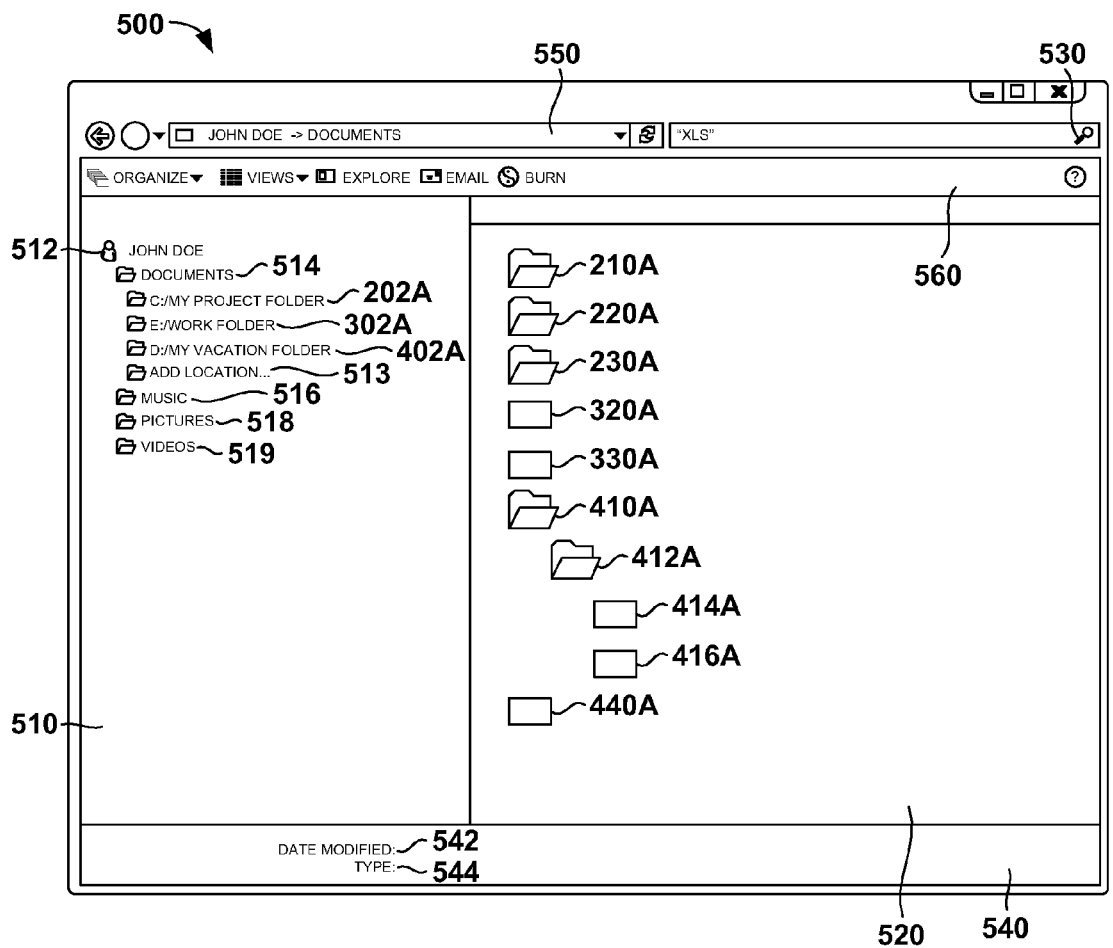
FIG. 6C, is a drawing of a graphical user interface for displaying search results as a folder hierarchy and browsing the search results to the second level according to an embodiment of the present invention.

Turning now to FIG. 6C, the replicated folder hierarchy is expanded to the next level upon the selection of replicated folder 412A. Upon the selection of folder 412A, file 414A and file 416A are shown. Both file 414A and file 416A are spreadsheet files.

Figure 7A:
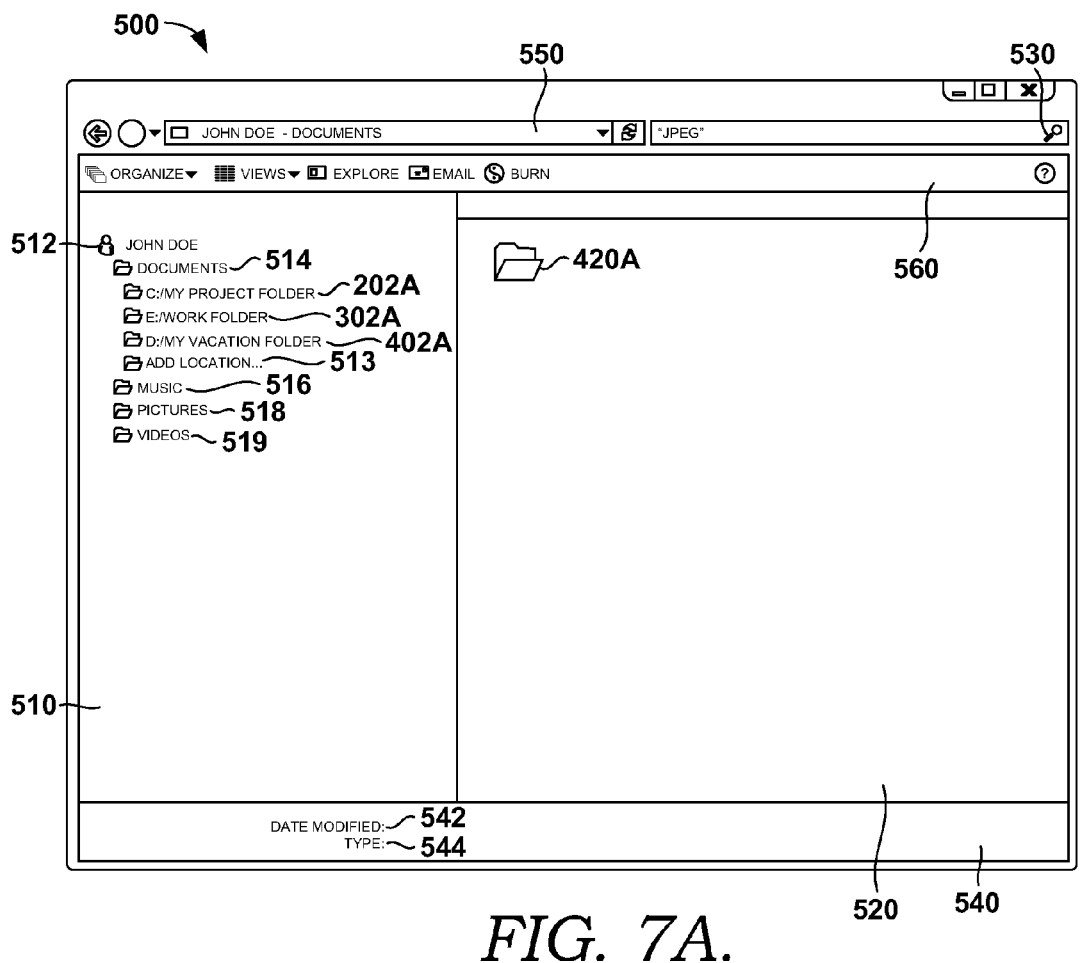
FIG. 7A, is a drawing of a graphical user interface for displaying search results as a folder hierarchy where a data source is selected and search criteria submitted according to an embodiment of the present invention.
Figure 7B:
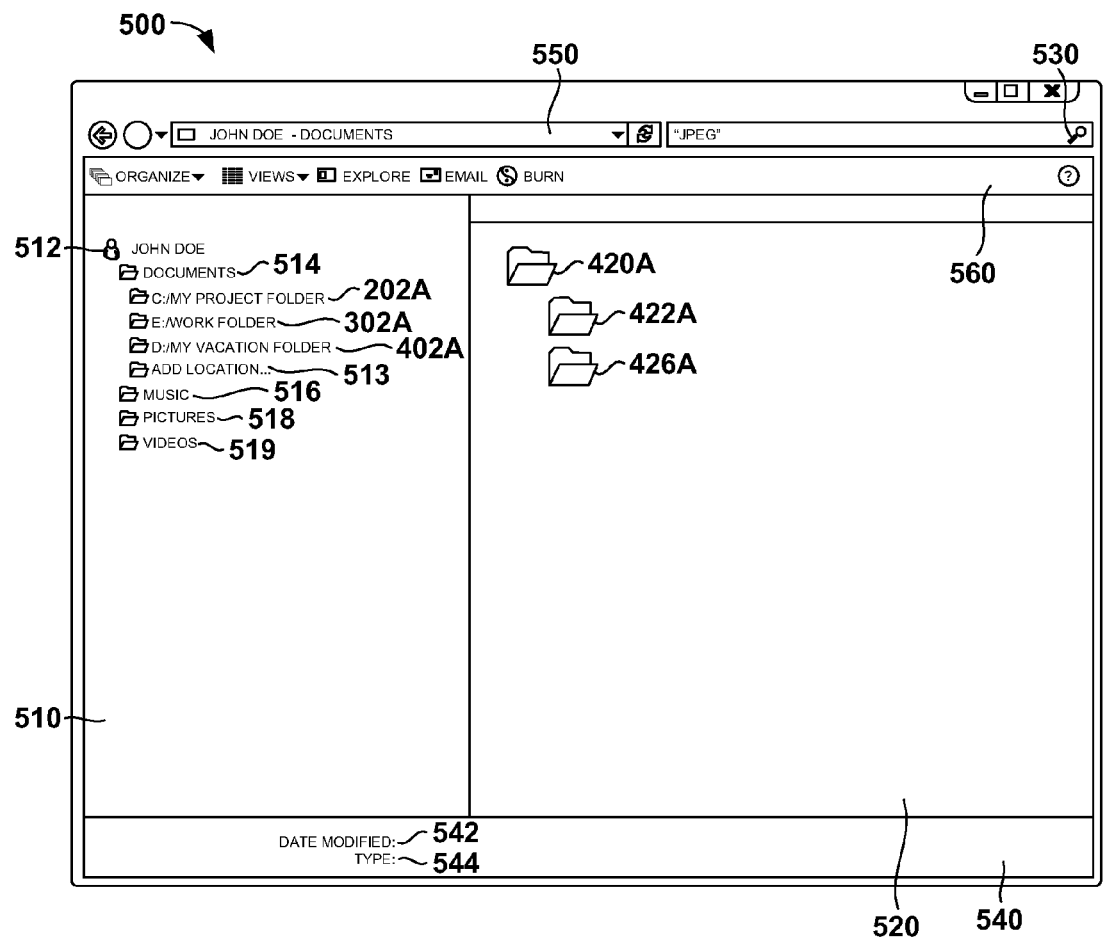
FIG. 7B, is a drawing of a graphical user interface for displaying search results as a folder hierarchy and browsing the search results to the first level according to an embodiment of the present invention.
Figure 7C:
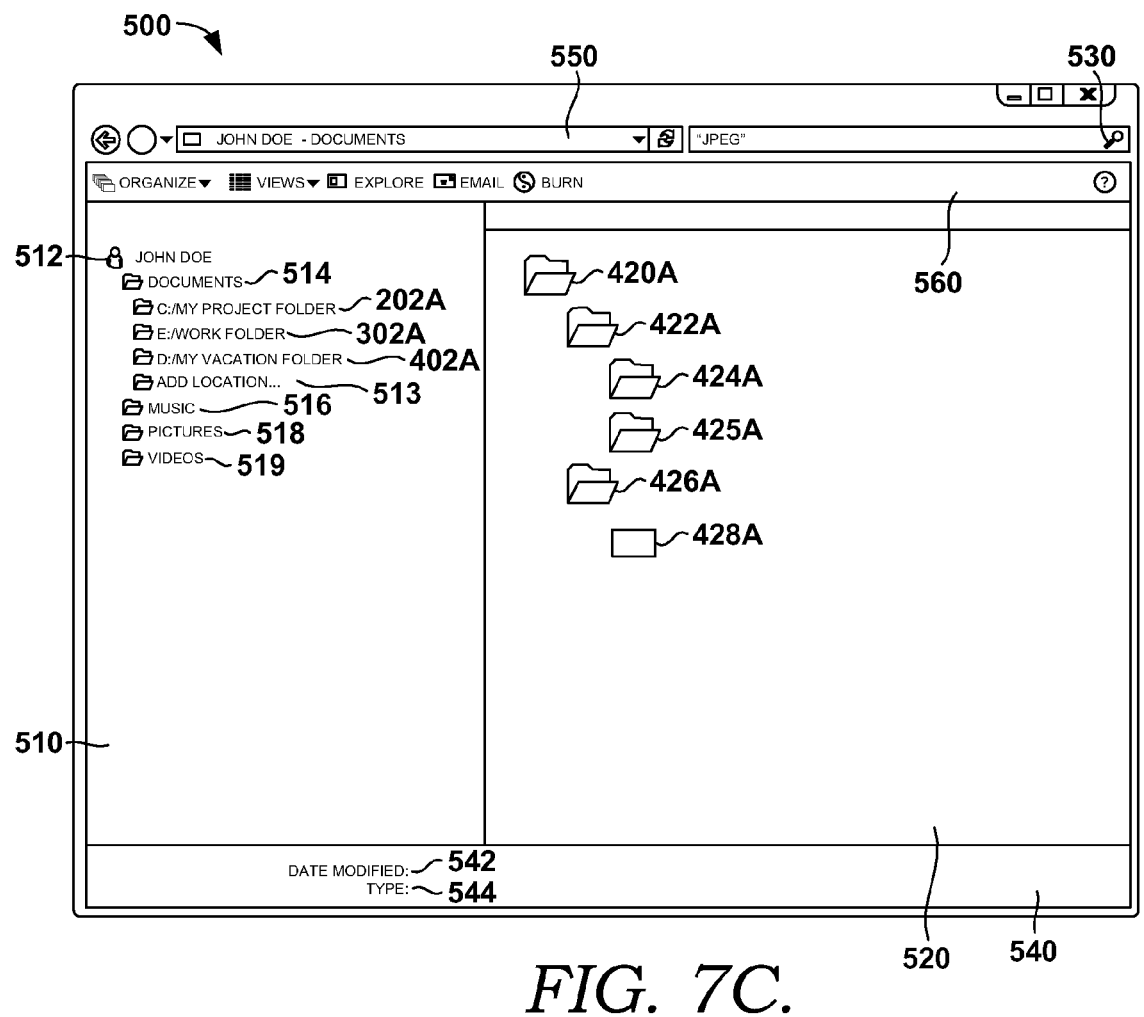
FIG. 7C, is a drawing of a graphical user interface for displaying search results as a folder hierarchy and browsing the search results to the second level according to an embodiment of the present invention.

FIGS. 7A-C show a second search result presented in response to the selection of a data source and the submission of a search criteria. As with the illustrative search shown in FIGS. 6A through 6C, the selected library is library 514. The selected library is displayed in location portion 550, as explained previously. The search criteria entered into input portion 530 is "jpeg." As a result, only folder 420A is shown in items-view portion 520. Only folder 420A is shown because only folder 420A contains files with the jpeg extension.

FIG. 7B shows the result of selecting folder 420A. Specifically, folder 422A and 426A are shown. As can be seen, in FIG. 7C, both folder 422A and folder 426A contain files with the jpeg extension. FIG. 7C shows the display in items-view portion 520 upon the selection of both folder 422A and folder 426A. Upon the selection of these folders, file 424A, file 425A, and file 428A are shown.

FIG. 8 shows a third search result presented in response to the selection of a data source and the submission of a search criteria. In this example, folder 202A within library 514 is selected as can be seen in location portion 550. In addition, the search criteria is "XLS" as can be seen in input portion 530. This combination of search criteria will return all folders and files that contain a spreadsheet file within folder 202A. In items-view portion 520 folder 210A, folder 220A, folder 230A, and file 240A are shown. All the folders shown contain at least one spreadsheet file, and file 240A itself is a spreadsheet file. In the initial view, only the subfolders directly beneath the selected data source are shown.

Figure 8A:
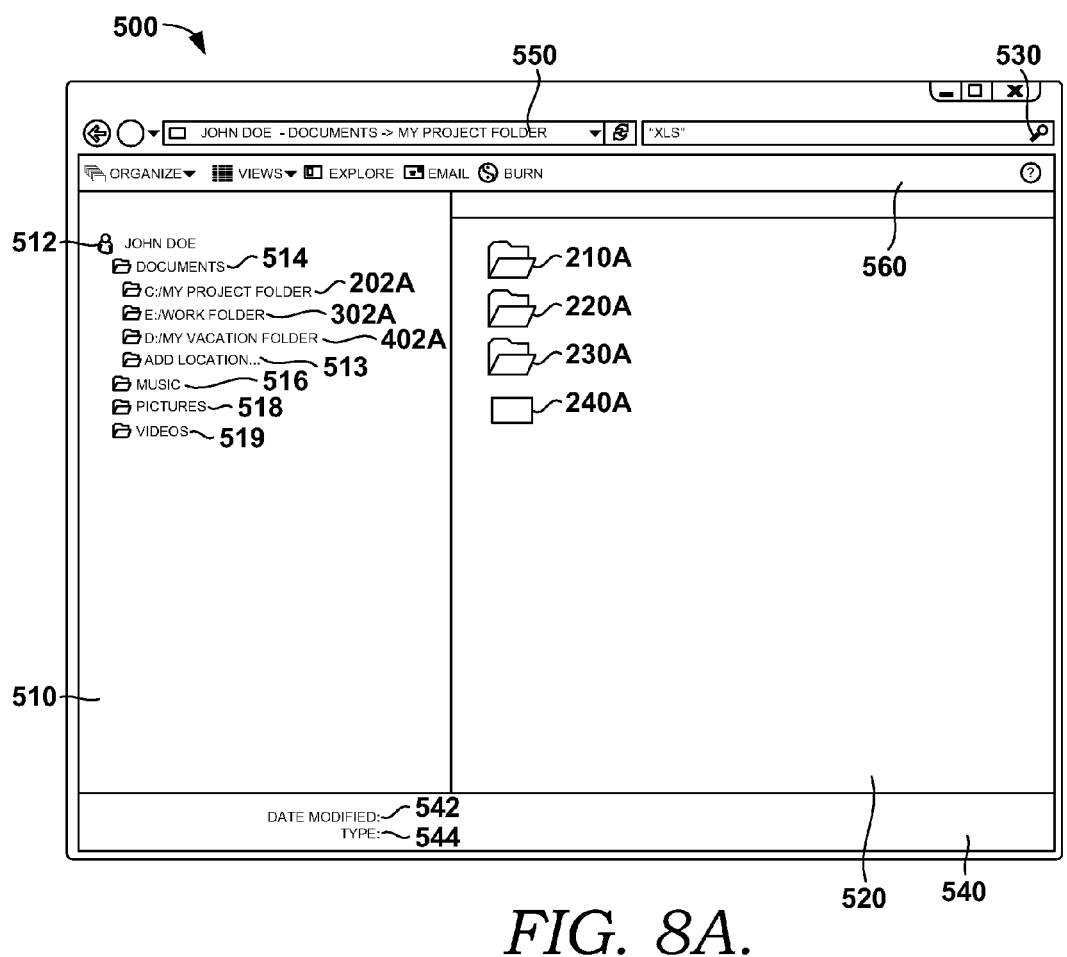
FIG. 8A, is a drawing of a graphical user interface for displaying search results as a folder hierarchy where a data source is selected and search criteria submitted according to an embodiment of the present invention.
Figure 8B:
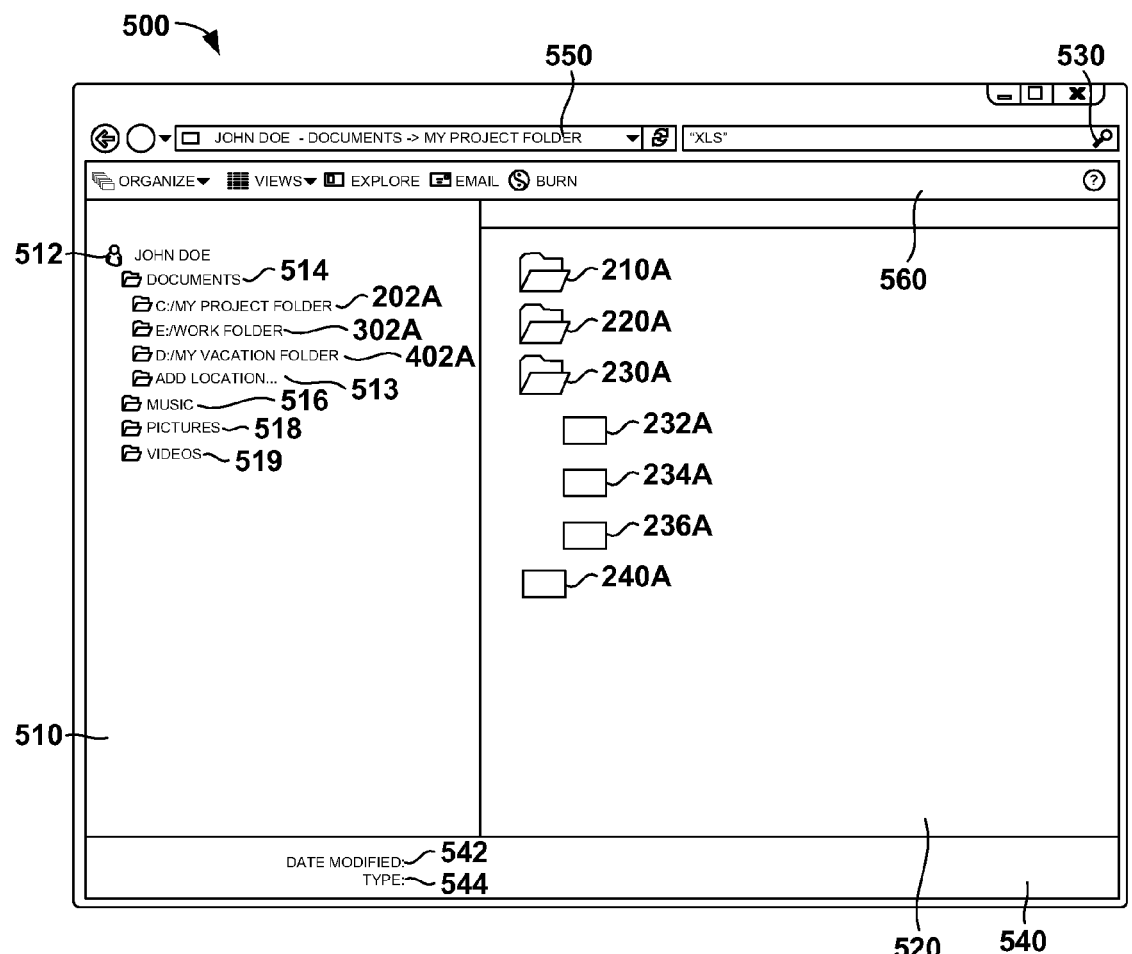
FIG. 8B, is a drawing of a graphical user interface for displaying search results as a folder hierarchy and browsing the search results to the first level according to an embodiment of the present invention.
Figure 8C:
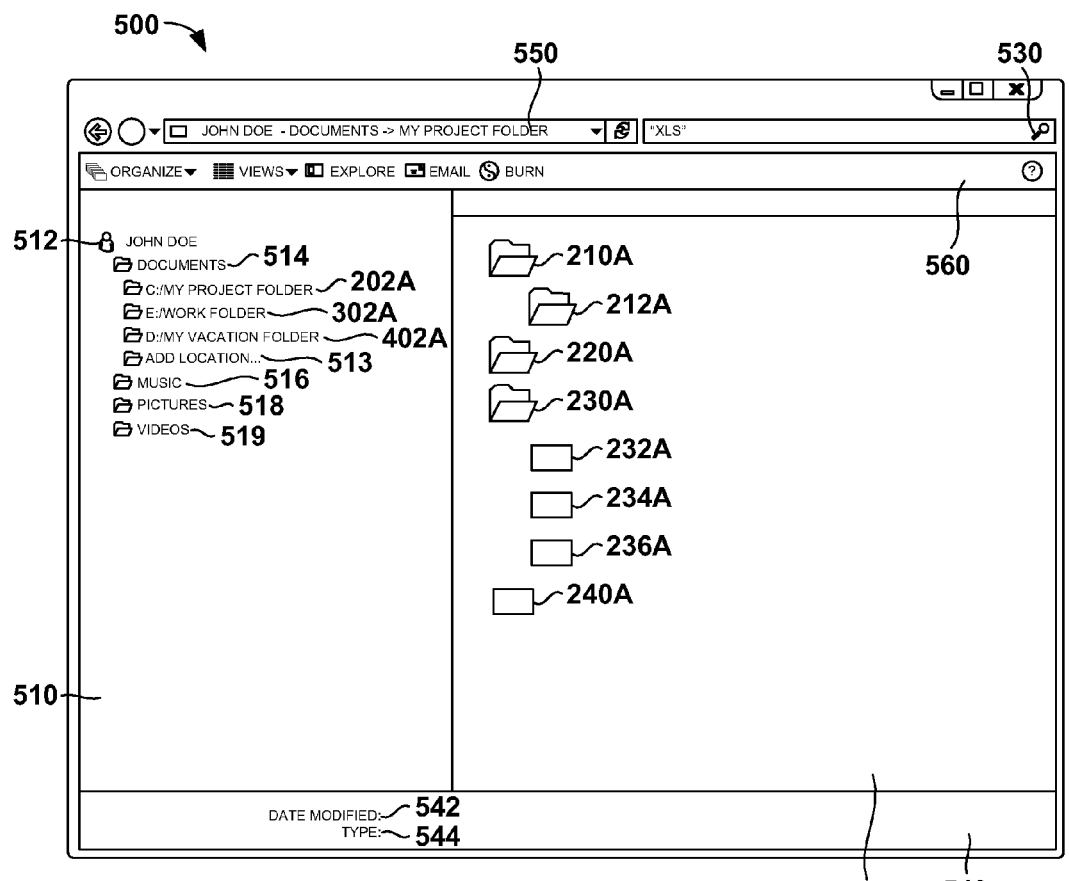
FIG. 8C, is a drawing of a graphical user interface for displaying search results as a folder hierarchy and browsing the search results to the second level according to an embodiment of the present invention.
Figure 8D:
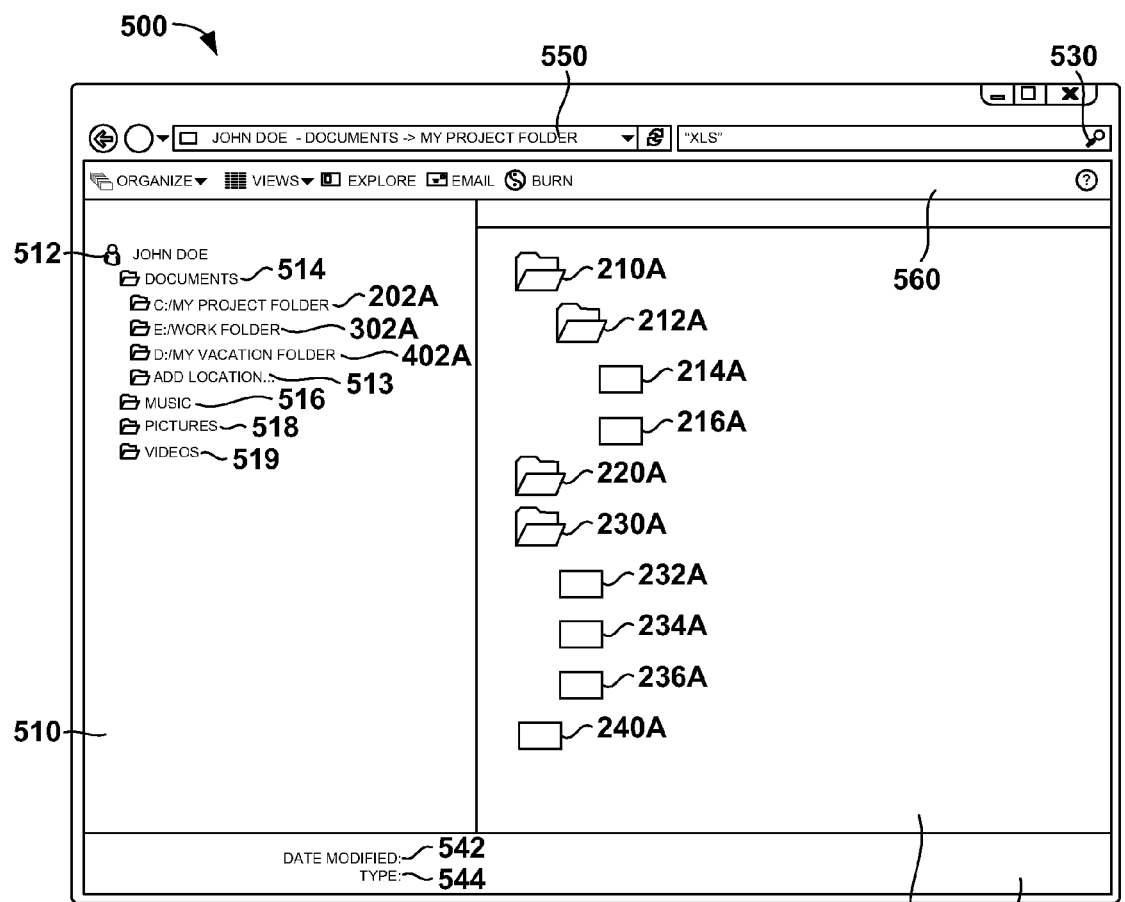
FIG. 8D, is a drawing of a graphical user interface for displaying search results as a folder hierarchy and browsing the search results to the second level according to an embodiment of the present invention.

FIG. 8B, shows the search results after folder 230A has been selected in the items-view portion 520. As a result of selecting folder 230A, file 232A, file 234A, and file 236A are shown. Each of these files is a spreadsheet file. FIG. 8C, shows the result of selecting folder 210A. Specifically, folder 212A is shown. Notice that file 218A is not shown because it is not a spreadsheet file. FIG. 8D shows the result of selecting folder 212A. Specifically, spreadsheet files 214A and 216A are shown. In each of FIGS. 8A-D files and folders that do not contain at least one spreadsheet file are not shown.

Figure 8E:
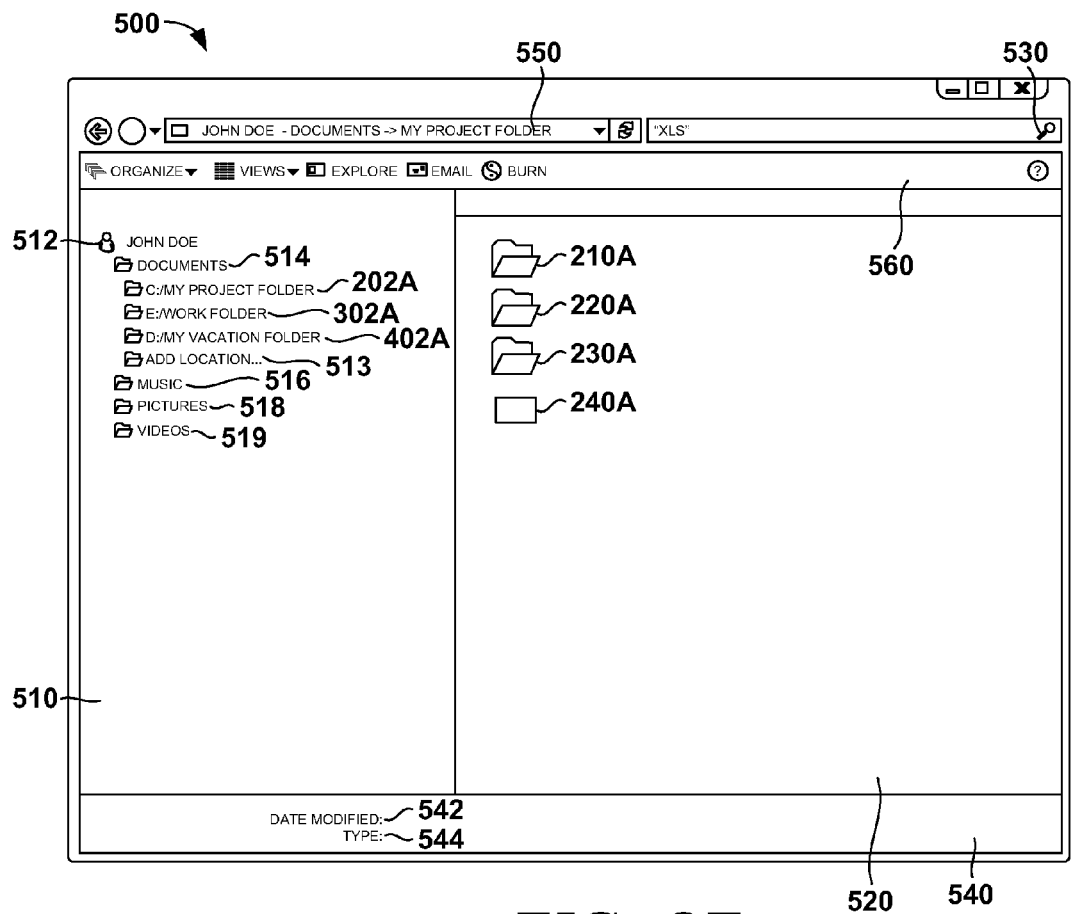
FIG. 8E, is a drawing of a graphical user interface for displaying search results as a folder hierarchy as a single layer according to an embodiment of the present invention.
Figure 8F:
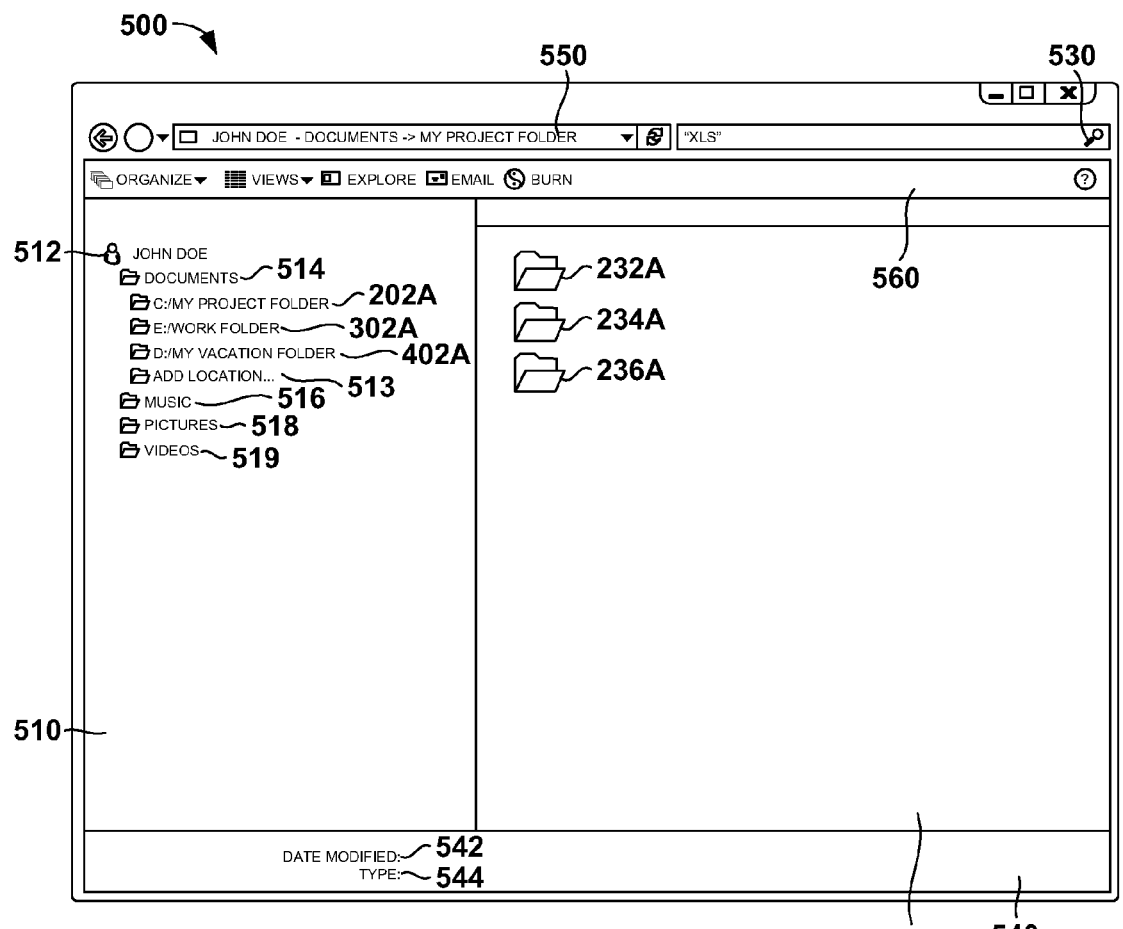
FIG. 8F, is a drawing of a graphical user interface for displaying search results as a folder hierarchy as a single layer and browsing the search results to the second level according to an embodiment of the present invention.

FIGS. 6A-E, 7A-C, and 8A-D show one embodiment of presenting search results in a folder hierarchy. The search results are presented in items-view portion 520 as an expanding folder hierarchy in which additional layers of the hierarchy are shown indented beneath the layers above. As a result, several layers of the hierarchy are shown at the same time. In another embodiment, only one layer of the hierarchy is shown at a time. FIGS. 8E-F illustrate this embodiment using the same search criteria present in FIG. 8A-D, as explained above with reference to FIG. 8A. In the additional embodiment, the initial presentation of search results shows only a top layer. This is identical to the first embodiment, thus FIG. 8A, and FIG. 8E are identical. FIG. 8E illustrates what happens when folder 230A in the items-view portion 520 is selected. In FIG. 8E, only file 232A, file 234A, and file 236A are shown. Each of these files is a spreadsheet file and, therefore, matches the search criteria. Notice that the files and folders on the layer above file 232A, file 234A, and file 236A are not shown. These are just two embodiments for displaying search results in a folder hierarchy. These two embodiments are not exhaustive, and other embodiments of displaying search results may also fall within the scope of the present application.

Figure 9:
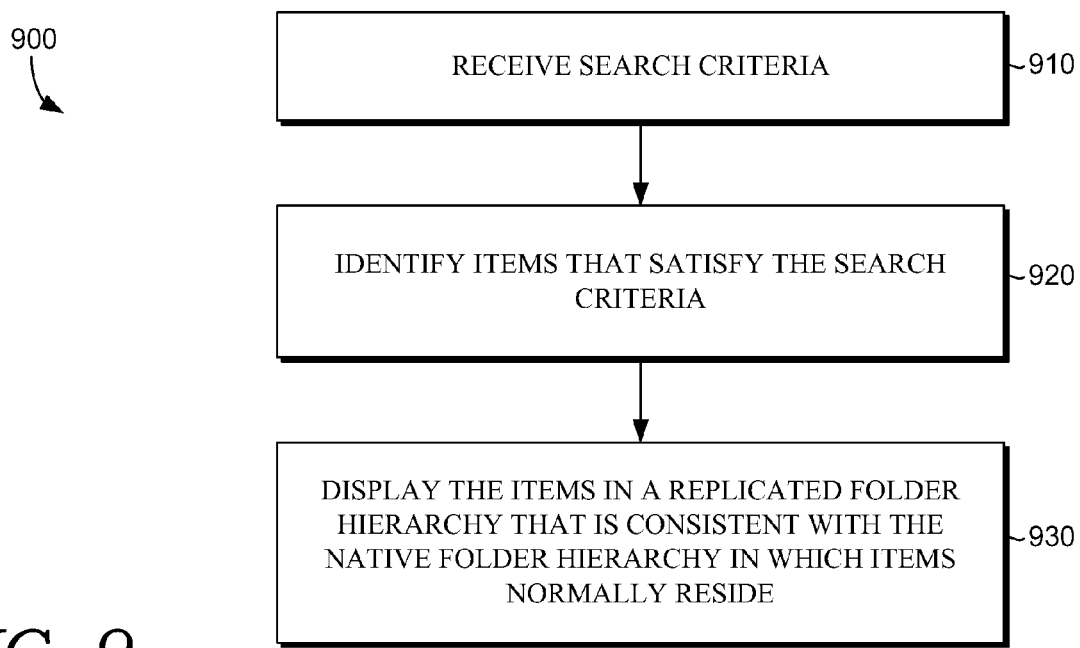
FIG. 9 is a flow diagram in which a method of presenting search results in a replicated folder hierarchy that is consistent with a native folder hierarchy in which the search results normally reside is shown in accordance with an embodiment of the present invention.

Turning now to FIG. 9, a method of presenting search results in a replicated folder hierarchy that is consistent with a native folder hierarchy in which the search results normally reside is disclosed. At step 910, search criteria that are to be used to search at least one data source that stores files and folders is received. Any possible characteristic of a file or folder may be a search criteria. The search criteria may be entered into a single filed or a search template could be used to collect search criteria. Other methods of receiving search criteria are also possible. Examples of search criteria include: a title; a word or phrase within a file or folder; an author; a date created; a date edited; a file type; and text within a file. A data source is any bounded collection of data. The bounds may be physical, as in defined by a hardware device. The bounds may also be soft, as in a software partition in a memory device. A data source may be a physical memory device, such as a hard drive, or a subset of data on a physical memory device A data source could also be an individual file within a larger data source. For example, a data source could be the C drive on a computing device, or the My Documents folder within the C drive. In one embodiment, the two data sources are located in separate data storage devices. In another embodiment, the data sources may be located within the same data storage device, but include at least two separate folder hierarchies.

At step 920, items that satisfy the search criteria are identified. A folder might be an item. The folder would satisfy the search criteria if the folder contains at least one file, at any level, that satisfies the search criteria. The folder itself may also satisfy the search criteria if the characteristics of the folder (e.g., the folder name, date folder was created, and person creating the folder) match the search criteria. A folder contains a file matching the search criteria if any folder beneath it contains a matching file.

At step 930, the items are displayed in a replicated folder hierarchy that is consistent with the native folder hierarchy in which the items normally reside. A user may locate an item within the replicated folder hierarchy by starting from a top-level folder and browsing through the replicated folder hierarchy until the item is found. As described previously, the native folder hierarchy describes how the files and folders are organized within the actual data source. A replicated folder hierarchy is built from the search results and only includes items that are within the search results that otherwise are consistent with the native folder hierarchy. The replicated folder hierarchy may be built using location information from the identified items. In one embodiment, the replicated folder hierarchy has all of the functional characteristics of a native folder hierarchy. For example, a user may delete files, add files, change the name of files or folders, or drag a folder onto the desktop from the replicated folder hierarchy. The changes made to the replicated folder hierarchy will also be made to the native folder hierarchy. In one embodiment, the search criteria is a wildcard, thereby causing the replicated folder hierarchy to include all of the files and folders in the at least one data source.

Figure 10:
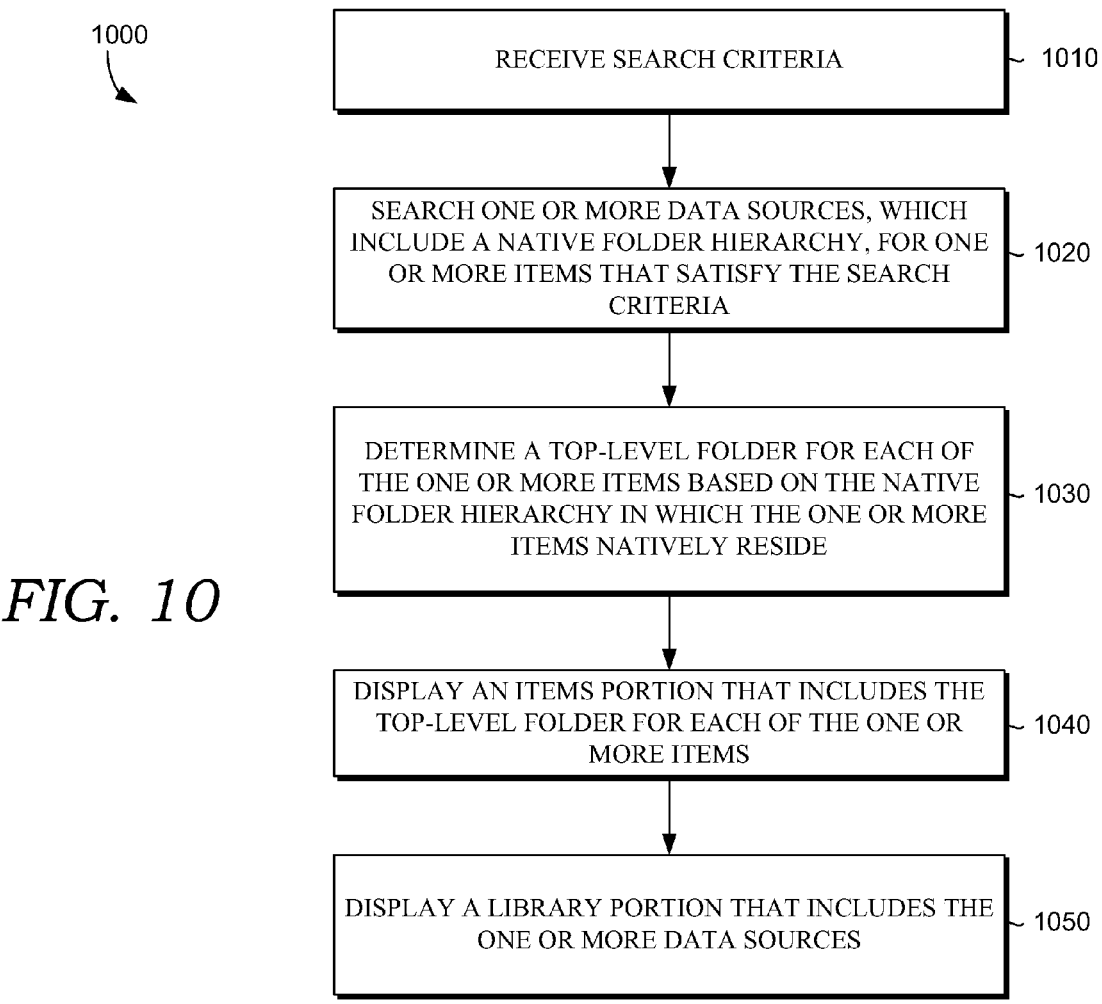
FIG. 10 is flow diagram illustrating an exemplary method of presenting items returned from a search according to an item's native folder hierarchy in accordance with an embodiment of the present invention.

Turning now to FIG. 10, a method of presenting items returned from a search according to an item's native folder hierarchy is described. At step 1010, search criteria are received. Search criteria in general, and the types of search criteria that may be received have been described previously. At step 1020, one or more data sources, which include at least one native folder hierarchy, are searched for one or more items that satisfy the search criteria. Data sources and native folder hierarchies have been described previously.

At step 1030, a top-level folder for each of the one or more items is determined based on the native folder hierarchy in which the one or more items natively reside. A top-level folder is a folder one level below the root folder, or data source. For example, if the data source is "My Documents," then any folder directly beneath (i.e. on the level directly below) the "My Documents" folder would be a top-level folder. At step 1040, an item portion that includes the top-level folder for each of the one or more items is displayed. An individual top-level folder is displayed only once, even though the individual top-level folder is the top-level folder for more than one of the one of the one or more items. In this manner, only top-level folders containing at least one item that satisfies the search criteria will be included in the initial presentation. In one embodiment, the items may be located by drilling down from the initially presented top-level folders.

At step 1050, a library portion that displays the one or more data sources is displayed concurrently with the items portion. The data source may be displayed as a folder hierarchy that is consistent with the native folder hierarchy present in the one or more data sources. In one embodiment, the library is presented as a root folder in each of the one or more data sources and is presented as a subfolder beneath the root folder. In one embodiment, the library, and folders beneath the library are browsable. In this manner, any subfolder within any of the data sources may be selected. When a folder is selected, the search is confined to the one or more selected folders.

In one embodiment, the items include files and folders. Only files and folders that satisfy the search criteria may be displayed as a user drills down from the top-level folders. The folder and files displayed in the replicated folder hierarchy behave like normal folders. The functional capabilities of these folders include receiving new files, copying the file from the folders, moving the file into the folders, moving the file out of the folders, and renaming the file or folders. Actions taken with the replicated files and folders will change the corresponding native files and folders.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well-adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The invention claimed is:

1. One or more computer-readable media having computer-executable instructions embodied thereon for presenting search results in a graphical user interface (GUI), the GUI comprising:
   a navigation portion that displays contents of a library that includes one or more data sources on which a search is to be conducted, wherein the contents of the library are displayed with the library as a root folder and the one or more data sources as subfolders of the root folder;
   an input portion that receives search criteria that is used to determine the search results; and
   an items-view portion that displays the search results that are responsive to the search criteria,
   (1) wherein the search results include files and folders from the library that satisfy the search criteria,
   (2) wherein the search results are displayed in a hierarchal-folder format that is consistent with a native hierarchical folder structure in which the one or more items are stored, and
   (3) wherein the hierarchal folder format excludes files and folders in the native folder structure that do not satisfy the search criteria, and
   (4) wherein an initial presentation of the search results includes only first-level subfolders that ultimately contain the files and folders that satisfy the search criteria such that files and folders are viewable by drilling down from the first-level subfolders, and wherein only subfolders that ultimately contain the files and folders below the first-level subfolders are displayed incident to receiving input that acts on an individual first-level subfolder;
   wherein the navigation portion, the input portion, and the items-view portion are displayed simultaneously as parts of a single interface, and wherein renaming the file and folders in the replicated folder hierarchy cause the same renaming to be made to corresponding files and corresponding folders within the native folder hierarchy.

2. The media of claim 1, wherein at least a subset of the library is designatable as being included in the search that is to be conducted.

3. The media of claim 1, wherein the navigation portion further comprises a selectable option that initiates a wizard that helps facilitate one or more of:
   creating a new library and populating the new library with data sources; and
   adding another data source to an existing library.

4. The media of claim 1, wherein the one or more data sources in the library are not located within a single data source.

5. The media of claim 1, wherein the at least one data source includes at least two data sources with separate folder hierarchies.

6. The media of claim 5, wherein the folder satisfies the search criteria if the folder contains at least one file, at any level, that satisfies the search criteria.

7. One or more computer-readable media having computer executable instructions embodied thereon for performing a method of presenting search results in a replicated folder hierarchy that is consistent with a native folder hierarchy in which the search results normally reside, the method comprising:
   receiving search criteria that is to be used to search at least one data source that stores files and folders in a native folder hierarchy;
   identifying items that satisfy the search criteria, wherein one of the items is a folder, and the folder satisfies the search criteria because the folder contains at least one file, at any level, that satisfies the search criteria;
   displaying the items in a replicated folder hierarchy that is consistent with the native folder hierarchy in which items normally reside, wherein an initial presentation of the search results includes only first-level subfolders that ultimately contain the files and folders that satisfy the search criteria such that a user may locate an item within the replicated folder hierarchy by starting from a top-level folder and browsing through the replicated folder hierarchy until the item is located, wherein the replicated folder hierarch excludes folders within the native folder hierarchy that do not contain at least one file, at any level, that satisfies the search criteria; and wherein changes made to the items in the replicated folder hierarchy cause the same changes to be made to corresponding files and corresponding folders within the native folder hierarchy.

8. The method of claim 7, wherein the search criteria is a wildcard, thereby causing the replicated folder hierarchy to include all of the files and folders in the at least one data source.

9. The method of claim 7, wherein the at least one data source includes two data sources that are located in separate data storage devices.

10. The method of claim 7, wherein the at least one data source includes at least two data sources with separate folder hierarchies.

11. One or more computer-readable media having computer-executable instructions embodied thereon for performing a method of presenting items returned from a search according to an item's native folder hierarchy, the method comprising:

receiving search criteria;

searching one or more data sources, which include a native folder hierarchy, for one or more items that satisfy the search criteria;

determining a top-level folder for each of the one or more items based on the native folder hierarchy in which the one or more items natively reside;

displaying an items portion that includes only the top-level folder for each of the one or more items in a replicated folder hierarchy that is consistent with the native folder hierarchy in which top-level folders actually reside, wherein an individual top-level folder is displayed only once even though the individual top-level folder is the top-level folder for more than one of the one or more items;

receiving an indication that the individual top-level folder is selected; and displaying only sub-folders and files that satisfy the search criteria, wherein a folder satisfies the search criteria if the folder contains at least one file, at any level, that satisfies the search criteria, wherein changes made to items in the replicated folder hierarchy cause the same changes to be made to corresponding items within the native folder hierarchy.

12. The media of claim 11, further comprising displaying a library portion that includes the one or more data sources, wherein the library portion is displayed concurrently with the items portion.

13. The media of claim 12, wherein the library portion is displayed as a folder hierarchy that is consistent with a native folder hierarchy present in the one or more data sources, wherein the library is presented as a root folder and each of the one or more data sources is presented as a subfolder beneath the root folder, and wherein the one or more data sources are browsable, such that the subfolders beneath the data sources are presented upon selection of the data sources.

14. The media of claim 11, wherein the one or more items include one or more of a file and a folder.

15. The media of claim 14, wherein functional capabilities of the folders include one or more of:

receiving new files,
copying the file from the folders,
moving the file into the folders,
moving the file out of the folders, and
renaming the file and folders.

16. The media of claim 14, wherein a replicated folder hierarchy including only files that satisfy the search criteria and folders that contain files that satisfy the search criteria, but is otherwise consistent with a native folder hierarchy beneath the individual top-level folder, is accessible by selecting the individual top-level folder.

17. The media of claim 11, wherein changes made to the items in the items portion cause the same changes to be made to corresponding files and corresponding folders within the native folder hierarchy.

* * * * *